(12) United States Patent
Hunt et al.

(10) Patent No.: US 7,047,712 B1
(45) Date of Patent: May 23, 2006

(54) SELF-PROPELLED MOWER HAVING ENHANCED MANEUVERABILITY

(75) Inventors: Kenneth Edward Hunt, Rock Hill, SC (US); David Roy Holm, Oconomowoc, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/292,863

(22) Filed: Dec. 1, 2005

Related U.S. Application Data

(63) Continuation of application No. 10/808,119, filed on Mar. 23, 2004.

(60) Provisional application No. 60/524,143, filed on Nov. 21, 2003.

(51) Int. Cl.
*A01D 75/30* (2006.01)

(52) U.S. Cl. ............................................................. 56/6

(58) Field of Classification Search .................. 56/6, 56/10.2 R, 10.2 A, 10.5, 11.9, 14.7, DIG. 2, 56/DIG. 7, DIG. 15; 701/50
See application file for complete search history.

(56) References Cited

U.S. PATENT DOCUMENTS

| | | | |
|---|---|---|---|
| 2,498,418 A | * | 2/1950 | Hanford ..................... 430/379 |
| 3,203,500 A | | 8/1965 | Gaberson et al. .......... 180/79.1 |
| 3,550,714 A | * | 12/1970 | Bellinger ..................... 180/168 |
| 3,572,458 A | * | 3/1971 | Tax ............................. 180/411 |

(Continued)

FOREIGN PATENT DOCUMENTS

GB    2 124 798 A    2/1984

(Continued)

OTHER PUBLICATIONS

Dave Doding. Planetary Rovers Might Roam Better with an Elastic Loop Mobility System [online] date Jun. 22, 1998 [retrieved on Mar. 10, 2004]. Retrieved from the Internet:<URL: http://science.msfc.nasa.gov/newhome/headlines/msad28apr98_1b.htm>.

(Continued)

*Primary Examiner*—Árpád Fábián Kovács

(57) ABSTRACT

A frame of a mower supports wheel assemblies, a propulsion unit, and a mowing deck. Each wheel assembly is associated with a corresponding wheel, a corresponding electrical steering motor, and a corresponding electrical drive motor. A controller controls a direction of orientation of the corresponding wheel via the corresponding electrical steering motor. Further, the controller controls the application of electrical energy to the corresponding drive motor consistent with maneuverable movement of the mower. The propulsion unit is capable of rotating at least one cutting blade. A mowing deck houses the at least one cutting blade. The mowing deck has indentations to provide a spatial zone for the plurality of wheel assemblies.

13 Claims, 14 Drawing Sheets

U.S. PATENT DOCUMENTS

| | | | | |
|---|---|---|---|---|
| 3,650,097 | A | | 3/1972 | Nokes ..................... 56/10.2 |
| 4,119,900 | A | | 10/1978 | Kremnitz ................. 318/587 |
| 4,463,821 | A | * | 8/1984 | Falamak ................. 180/168 |
| 4,964,265 | A | * | 10/1990 | Young ..................... 56/10.8 |
| 5,163,273 | A | * | 11/1992 | Wojtkowski et al. ....... 56/11.9 |
| 5,323,593 | A | | 6/1994 | Cline et al. ................. 56/10.2 |
| 5,528,888 | A | | 6/1996 | Miyamoto et al. ....... 56/10.2 F |
| 5,572,856 | A | * | 11/1996 | Ku ........................ 56/10.2 A |
| 5,719,762 | A | | 2/1998 | Kanayama ........... 364/424.027 |
| 5,974,347 | A | * | 10/1999 | Nelson ..................... 701/22 |
| 6,443,509 | B1 | | 9/2002 | Levin et al. ................ 293/4 |
| 6,604,348 | B1 | | 8/2003 | Hunt ....................... 56/10.6 |
| 2001/0047231 | A1 | | 11/2001 | Peless et al. ................ 701/23 |
| 2002/0023788 | A1 | | 2/2002 | Torrie et al. ............. 180/9.26 |
| 2002/0104300 | A1 | | 8/2002 | Hunt ....................... 56/10.6 |
| 2003/0085680 | A1 | | 5/2003 | Wakitani et al. ............ 318/432 |
| 2003/0144774 | A1 | | 7/2003 | Trissel et al. ................ 701/23 |
| 2003/0226340 | A1 | | 12/2003 | Havermans et al. ......... 56/10.2 |
| 2003/0229425 | A1 | | 12/2003 | Miedema ..................... 701/1 |
| 2003/0229435 | A1 | | 12/2003 | Van der Lely ............... 701/50 |
| 2004/0010343 | A1 | | 1/2004 | Dean ....................... 700/245 |

FOREIGN PATENT DOCUMENTS

WO      WO 01/70009 A2    9/2001

OTHER PUBLICATIONS

Autonomous Solutions, Inc. ODIS [online] [retrieved on date Dec. 1, 2003]. Retrieved from the Internet:<URL: http://autonomoussolutions.com/research/projects/odis.html>.

The Robotics Institute.Lunar Rover Navigation 1996 System Architecture [online] date Nov. 1996 [retrieved on Mar. 10, 2004]. Retrieved from the Internet :<URL:http://www-2.cs.cmu.edu/~lri/architecture.shtml>.

The Robotics Institute. The Navigation System [online] date Mar. 1995 [retrieved on Mar. 10, 2004]. Retrieved from the Internet:<URL:http://www-2.cs.cmu.edu/afs/cs/project/lri/www/lrd/nav-navmap.html>.

Williamson Labs. Much Mower [online] date 1999 [Retrieved on Dec. 1, 2003]. Retrieved from the Internet: <URL:http://www.williamson-labs.com/muchmower.htm>.

* cited by examiner

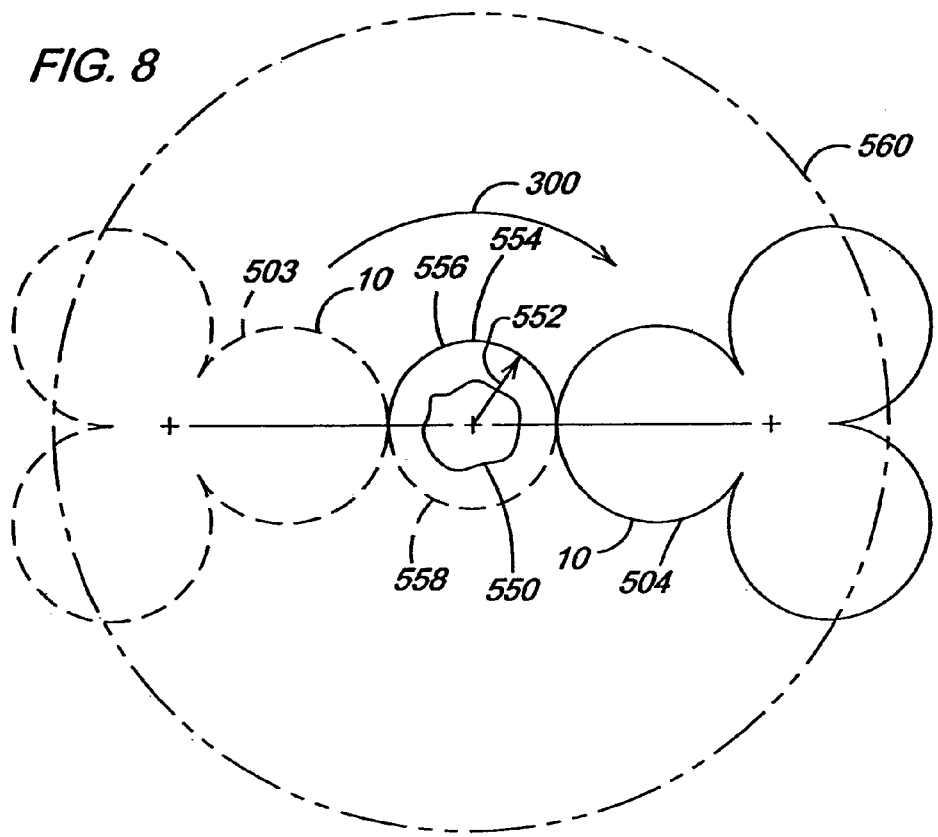

FIG. 8

S500 — IDENTIFY A TARGET AREA FOR APPLICATION OF THE NEAR ZERO RADIUS TRIM OR GREATER THAN ZERO RADIUS TRIM MANEUVER.

S501 — POSITION A CRITICAL POINT OF THE MOWING DECK OR AN OUTER PERIPHERY OVER A REFERENCE ARC.

S502 — ALIGN THE STEERED DIRECTION OF THE WHEELS TO BE GENERALLY TANGENTIAL TO RESPECTIVE ARCS THAT ARE GENERALLY CONCENTRIC WITH RESPECT TO THE REFERENCE ARC.

S504 — CONTROL THE APPLICATION OF ROTATIONAL MECHANICAL ENERGY TO ONE OR MORE OF THE WHEELS TO ROTATE THE MOWER ABOUT THE OBJECT BY A DESIRED FRACTION AND/OR NUMBER OF REVOLUTIONS.

FIG. 9

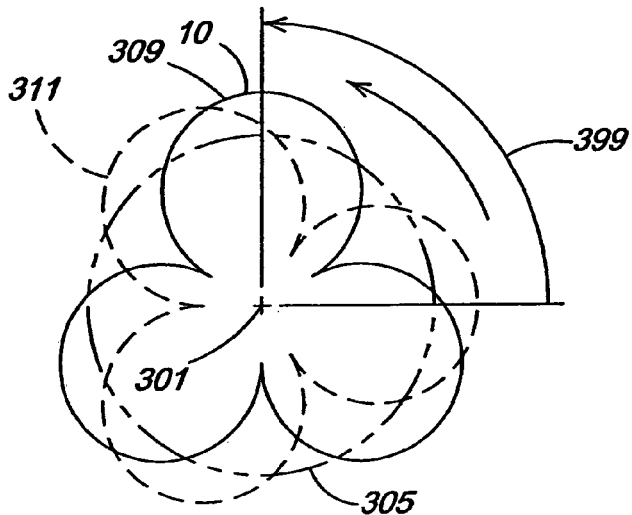

FIG. 11

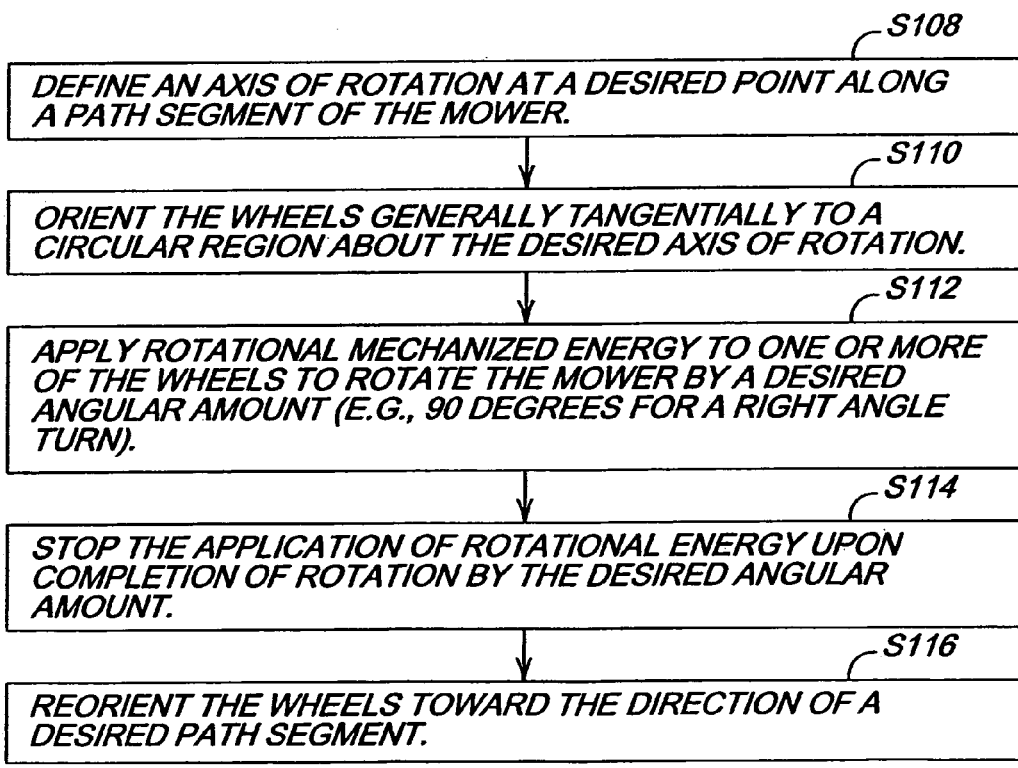

S108 — DEFINE AN AXIS OF ROTATION AT A DESIRED POINT ALONG A PATH SEGMENT OF THE MOWER.

S110 — ORIENT THE WHEELS GENERALLY TANGENTIALLY TO A CIRCULAR REGION ABOUT THE DESIRED AXIS OF ROTATION.

S112 — APPLY ROTATIONAL MECHANIZED ENERGY TO ONE OR MORE OF THE WHEELS TO ROTATE THE MOWER BY A DESIRED ANGULAR AMOUNT (E.G., 90 DEGREES FOR A RIGHT ANGLE TURN).

S114 — STOP THE APPLICATION OF ROTATIONAL ENERGY UPON COMPLETION OF ROTATION BY THE DESIRED ANGULAR AMOUNT.

S116 — REORIENT THE WHEELS TOWARD THE DIRECTION OF A DESIRED PATH SEGMENT.

FIG. 12

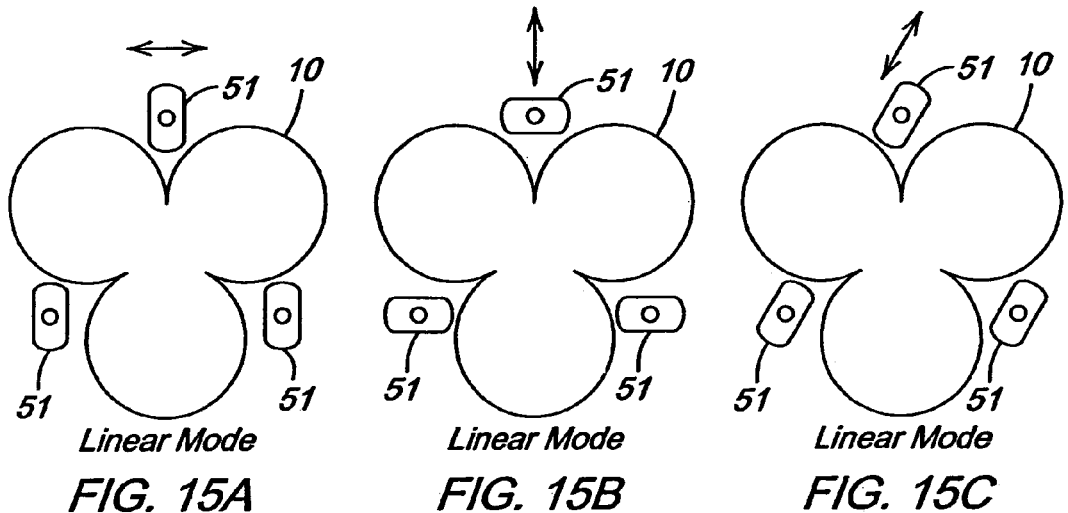
Linear Mode
FIG. 15A
Linear Mode
FIG. 15B
Linear Mode
FIG. 15C
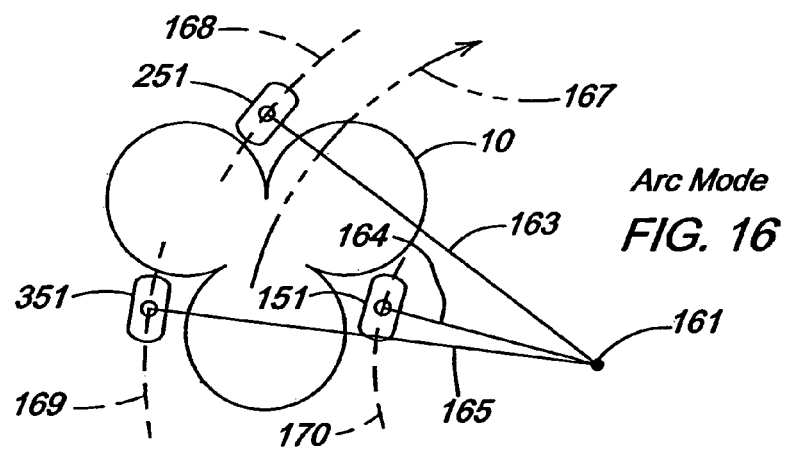
Arc Mode
FIG. 16
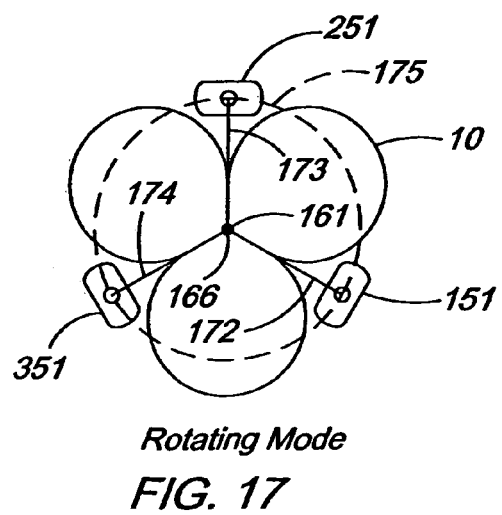
Rotating Mode
FIG. 17

*Interior Arc Mode*

*Trim Mode (Zero Radius)*

*Trim Mode
(Greater Than Zero Radius)*

FIG. 21 {
Path Plan Data
   1st Path Segment
      Starting Coordinate $(X_1, Y_1)$
      Destination Coordinate $(X_2, Y_2)$
      Mode (E.g., Linear, Arc, Rotating or Combination) $(M_1)$
      Reference Point Coordinate (Where Applicable) $(R_1)$ 2nd Path Segment
      Starting Coordinate $(X_2, Y_2)$
      Destination Coordinate $(X_3, Y_3)$
      Mode $(M_2)$
      Reference Point $(R_2)$
          ⋮

Nth Path Segment
      Starting Coordinate $(X_N, Y_N)$
      Destination Coordinate $(X_{N+1}, Y_{N+1})$
      Mode $(M_N)$
      Reference Point $(R_N)$
}

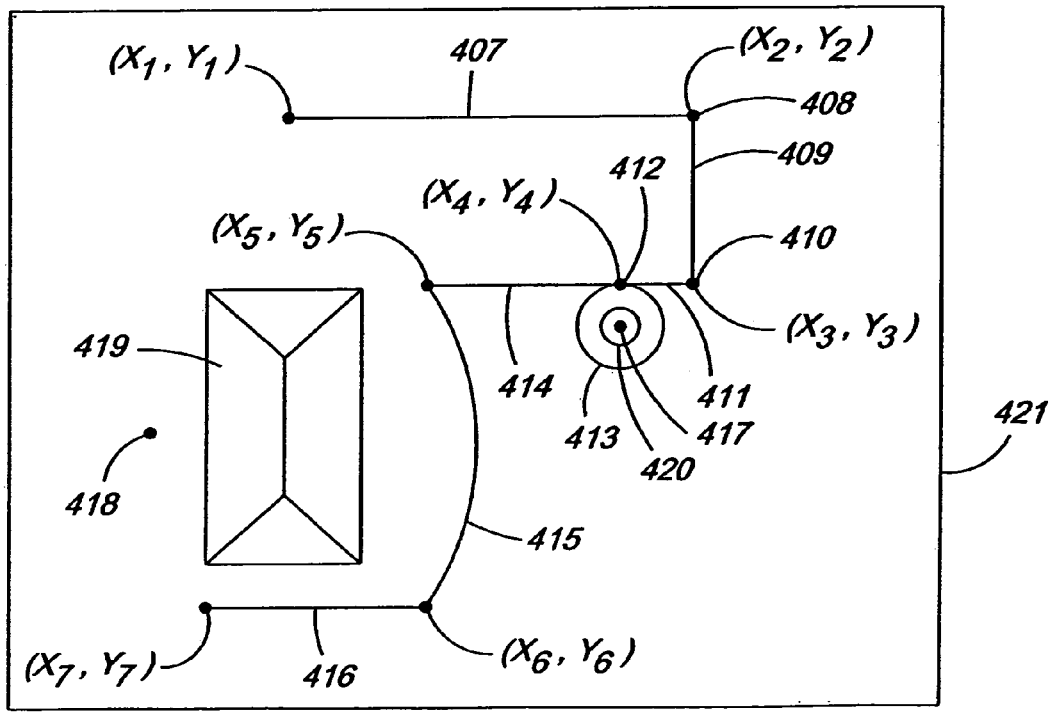

SELF-PROPELLED MOWER HAVING ENHANCED MANEUVERABILITY

This is a continuation of U.S. application Ser. No. 10/808,119, filed Mar. 23, 2004, and entitled SELF-PROPELLED MOWER HAVING ENHANCED MANEUVERABILITY (allowed), which claims the benefit of U.S. provisional application No. 60/524,143, filed Nov. 21, 2003, and entitled SELF-PROPELLED MOWER HAVING ENHANCED MANEUVERABILITY, under 35 U.S.C. 119(e).

FIELD OF THE INVENTION

This invention relates to a self-propelled mower having enhanced maneuverability for mowing vegetation.

BACKGROUND OF THE INVENTION

In the prior art, many mowers for mowing vegetation (e.g., grass) have a minimum turn radius of greater than fifteen inches. The minimum turn radius is generally limited by steering configurations, such as front-wheel steering, rear-wheel steering, all wheel steering, and Ackerman steering. A mower with a greater turning radius may consume more energy than a mower with a lesser turning radius to mow a given work area. For example, the mower with the greater turning radius may need to make more passes to cover the given work area or to shift from one row to the next adjacent row. Moreover, the mower with the greater turning radius facilitates completing a mowing task over a greater time period than a mower with a lesser turning radius of equivalent cutting width. Accordingly, there is a need to provide a mower with improved maneuverability and the smallest possible or desired turning radius.

SUMMARY OF THE INVENTION

A frame of a mower supports wheel assemblies, a propulsion unit, and a mowing deck. Each wheel assembly is associated with a corresponding wheel, a corresponding electrical steering motor, and a corresponding electrical drive motor. A controller controls a steering direction of orientation of the corresponding wheel via the corresponding electrical steering motor. Further, the controller controls the application of electrical energy to the corresponding drive motor consistent with maneuverable movement of the mower. The propulsion unit is capable of rotating at least one cutting blade. A mowing deck houses the at least one cutting blade. The mowing deck has indentations to provide a spatial zone for the plurality of wheel assemblies.

BRIEF DESCRIPTION OF THE DRAWINGS

FIG. 8 is a diagram that illustrates a top view of near zero radius trim or greater radius trim maneuver.

FIG. 9 is a method for making a near zero radius or greater radius trim maneuver.

FIG. 11 is a diagram that illustrates a top view of an approximately zero radius turn.

FIG. 12 is a method for making a generally zero radius turn maneuver.

FIG. 15A through FIG. 15C, inclusive, are plan views of the mower that show illustrative angular orientations of the wheels with respect to the steering axes for a linear mode.

FIG. 16 is a plan view of the mower that shows illustrative angular orientations of the wheels with respect to the steering axes for an arc mode.

FIG. 17 is a plan view of the mower that shows illustrative angular orientations of the wheels with respect to the steering axes for a rotating mode.

FIG. 21 represents a chart of an illustrative data structure for path plan data.

FIG. 22 is a top view of a path plan consistent with the illustrative data structure of FIG. 21.

Like reference numbers indicate like elements throughout the foregoing drawings.

DESCRIPTION OF THE PREFERRED EMBODIMENT

Figure 1:
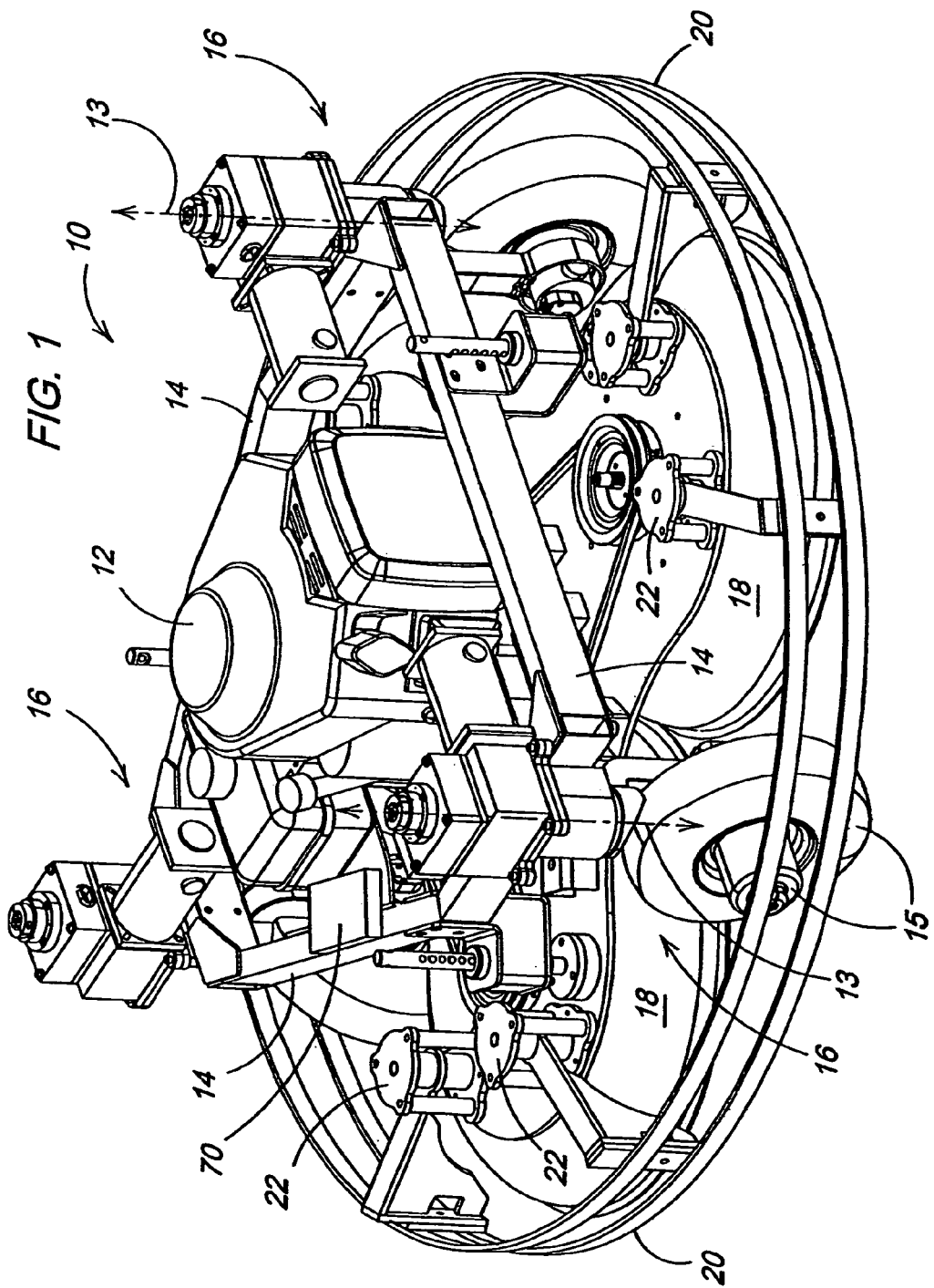
FIG. 1 is a perspective view of a self-propelled maneuverable mower.
Figure 4:
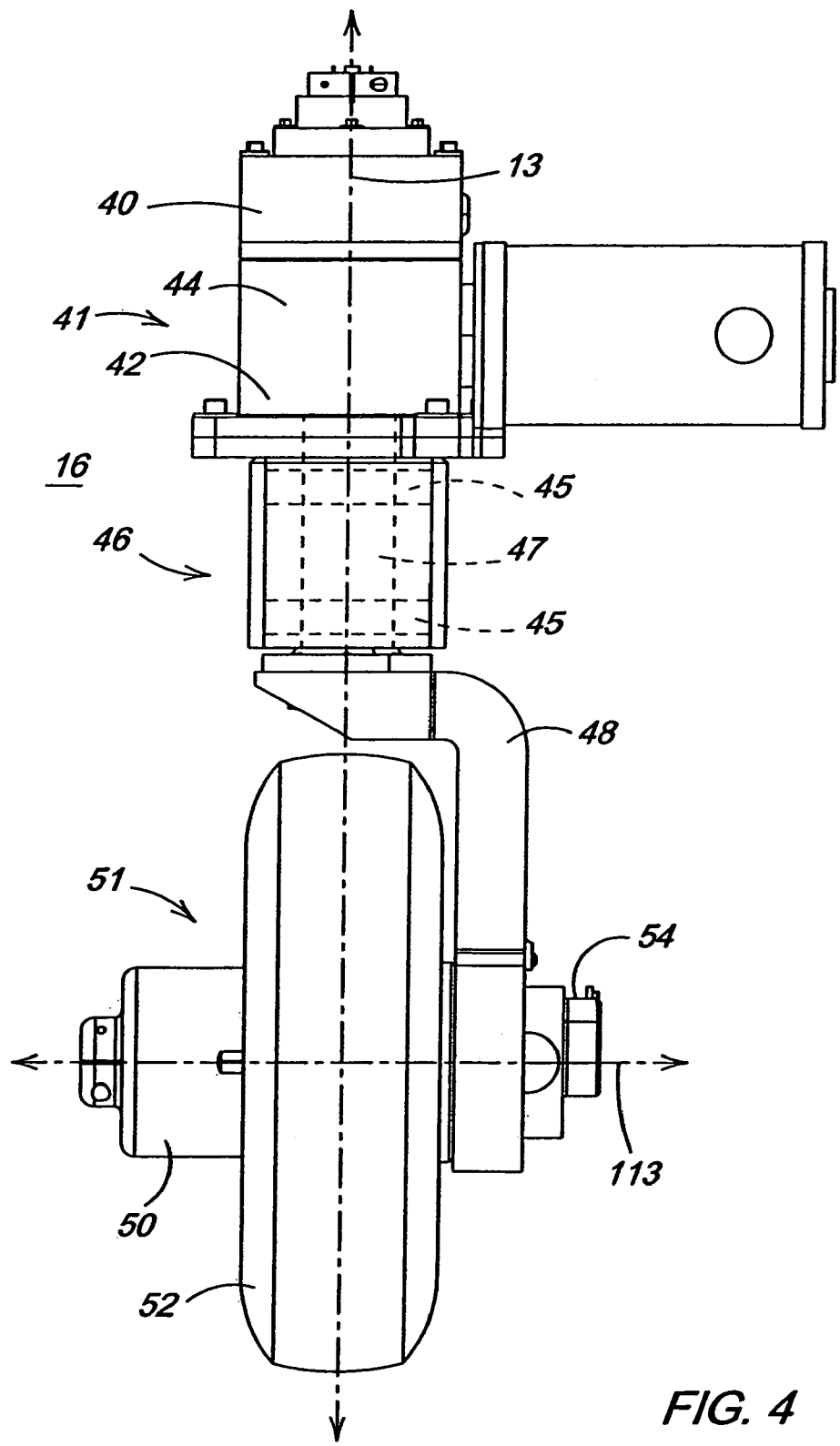
FIG. 4 illustrates a front view of a wheel assembly.

In FIG. 1, a mower 10 comprises a frame 14 that supports wheel assemblies 16, a controller 70, a propulsion unit 12, and a mowing deck 18. Although the frame 14 is shown as generally triangular and each wheel assembly 16 is positioned at or near each apex of sides of the triangle formed by the frame 14, other shapes of the frame are possible and fall within the scope of the invention. In one embodiment, each wheel assembly 16 is positioned approximately equidistant on a radius about a center point of the mower, as viewed from the top. Each wheel assembly 16 is associated with a corresponding wheel 51 (FIG. 4), a corresponding electrical steering motor 44 (FIG. 4), and a corresponding electrical drive motor 50 (FIG. 4).

A controller 70 (FIG. 5A and FIG. 5B) controls a direction of orientation of the corresponding wheel via the corresponding electrical steering motor 44 and application of electrical energy to the corresponding drive motor 50 consistent with omni-maneuverable movement or highly maneuverable movement of the mower 10. Omni-maneuverable means that the mower 10 can move in any direction from a starting point to a destination point; even if the path from the starting point to the destination point requires an approximately zero radius turn, an approximately zero radius trim, or a near zero radius trim. For example, the mower 10 can move from a starting point along the ground or in a generally horizontal plane (e.g., an x-y plane) to a destination point along the ground in the generally horizontal plane (e.g., the x-y plane) in any direction. The controller 70 is capable of individually controlling the steering rotation of each wheel about a generally vertical steering axis 13 of each wheel or controlling the steering rotation of a group of wheels in a coordinated manner. Further, the controller 70 is capable of individually controlling the propulsion rotation of each wheel about a wheel axis 113 (FIG. 4) of each wheel or controlling the propulsion rotation of a group of wheels in a coordinated manner.

The mowing deck 18 houses at least one cutting blade. The cutting blade has an outer edge which is farthest from a geometric center point of the mower 10. The mowing deck 18 has indentations 19 (FIG. 2) to provide a spatial zone for the plurality of wheel assemblies 16. For example, the spatial zone may be of sufficient size and shape to allow the wheels to rotate up to one complete revolution or more. In one embodiment, the mowing deck 18 comprises three generally semi-circular sections (e.g., a clover-leaf shape) having corresponding center points that are substantially equidistant to a geometric center point of the mower 10. Each generally semi-circular section contains a generally vertical shaft 24 coupled to a cutting blade. In one embodiment, each vertical shaft 24 may be equally spaced about the geometric center point of the mower 10, as viewed from the top. The periphery of the deck 18 has indentations 19 as the open regions between adjacent semi-circular sections.

The cutting blades provide a swath or cutting width that is greater than or equal to a center-line to center-line wheel spacing of the wheels for one or more movement modes (e.g., linear mode, arc mode, rotating mode, trim mode, and interior arc mode as described in later detail in FIG. 15A through FIG. 20, inclusive). Indentations 19 allow the wheels (including the entire tire width, wheel width, or track width) to be mounted in board within the cutting width or swath of the mower 10 as defined by one or more cutting blades. In one embodiment, the indentations 19 and the wheel size (e.g., diameter) are selected to balance the cutting width against traction and propulsion torque considerations such that the cutting width is greater than or equal to a spacing between the outer sides of tires on opposite sides of the mower 10 for the rotating mode and the linear mode.

A guard 20 may be connected to the deck 18 via a guard mounts 22. The guard mounts 22 may have bushings, elastomer, springs or another shock absorbing arrangement to absorb, at least partially, a shock of the vehicle from colliding with another object. The guard 20 provides a bumper that protects the mowing deck 18 from damage that otherwise might occur from striking or contacting objects.

The propulsion unit 12 comprises an engine, an internal combustion engine, a diesel engine, a gasoline engine, an alternating current electrical motor, direct current electrical motor, an induction motor, and an electrical motor. The propulsion unit 12 rotates at least one cutting blade to cut or mow vegetation (e.g., grass, weeds or ground cover), for example. The propulsion unit 12 may be associated with a belt and a pulley assembly for simultaneously rotating multiple cutting blades of the mowing deck 18. In an alternate embodiment, one of three cutting blades present in the mowing deck 18 may be disabled or not rotated to reduce power consumption of the propulsion unit 12 or a motor for driving the cutting blades. In yet another alternate embodiment, the cutting blade may be replaced by a dethatching device (e.g., a dethatching blade or a rake) for interaction with at least one of the ground, organic matter lying thereon, and any vegetation associated therewith.

Each wheel of the wheel assemblies 16 may rotate angularly over a desired range with respect to the steering axis to accommodate omni-maneuverable movement or a lesser freedom of movement of one or more wheels required to execute a planned, unplanned, dynamic or on-the-fly path of the mower 10. The controller 70 controls the wheels or wheel assemblies 16 with respect to the (a) one or more steering axes 13 and (2) one or more wheel axes 113 to move the mower 10 in a desired direction or in accordance with a desired pattern, pattern segment, path segment, path or maneuver. Although each wheel assembly may have a steering axis 13 that is generally perpendicular to the wheel axis 113, other geometric configurations are possible.

Figure 5A:
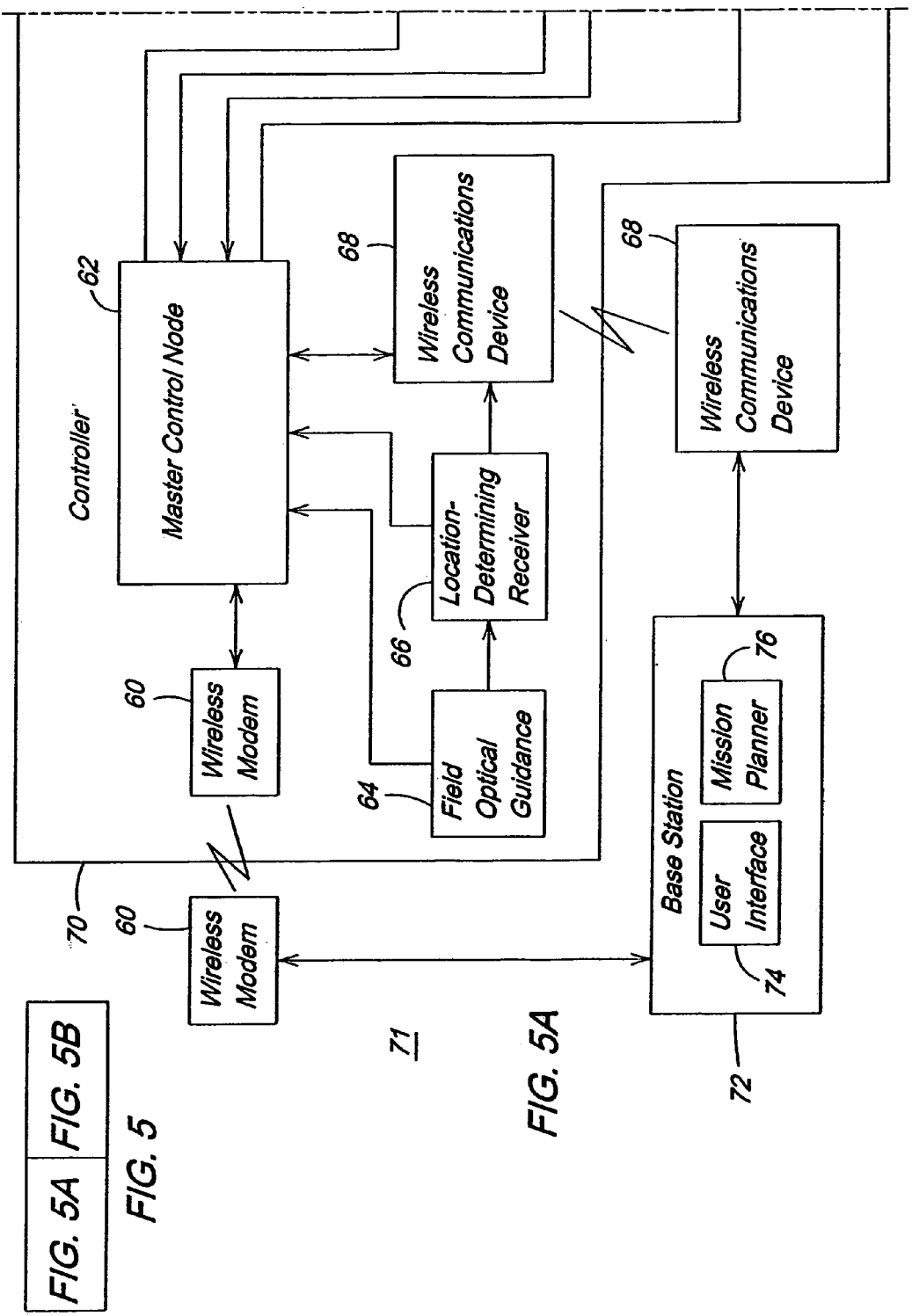
FIG. 5A and FIG. 5B is a block diagram for the electrical system of the mower.
Figure 5B:
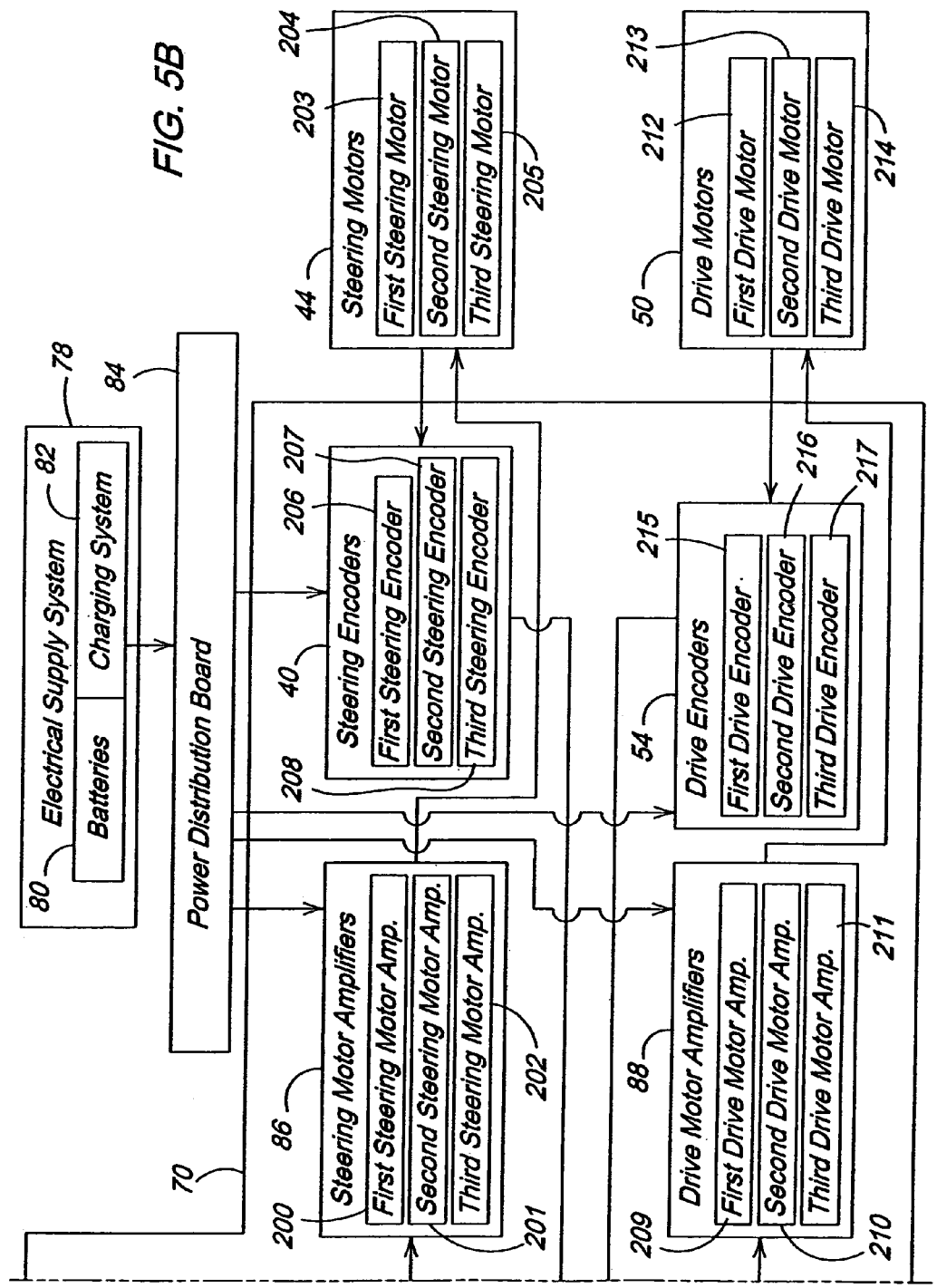

The possible motion and paths of the mower may be described with reference to a fixed reference point on the mower 10. A reference point may track a generally linear path, non-linear path, curved path or non-radius curved path, or any combination of the foregoing paths on the ground with a generally constant, rotating or changing vehicle orientation about a central axis associated with a center point of the mower 10, as viewed from a top view. A reference point on the mower 10 may rotate about one or more points on the ground outside the vehicle perimeter or within the vehicle perimeter of the mower 10; such rotation may be generally constant or at a variable rate. The mobility of the mower 10 may be combined with mowing along various paths to efficiently mow closely around objects, within areas with straight, curved or other boundary definitions. The controller 70 of the mower 10 may be configured to track predetermined paths or path segments (e.g., orthogonal turns) in accordance with program instructions or to follow remote control commands or automated path segments issued by an operator via a user interface 74 (FIG. 5A and FIG. 5B).

In accordance with a first desired maneuver that is referred to as a zero radius turn, the controller 70 orients the wheels generally tangentially to a substantially circular zone about center point of rotation of the mower 10 to provide a zero turn radius for the movement of the mower 10 about the center point for a desired degree of angular rotation ranging from a fractional revolution (e.g., 90 degrees for a substantially right angle turn) to one or more revolutions. The zero radius turn may be used to "clean-up" corners or mow interior corners of a work area by making multiple passes of the cutting blade over the same vegetation. The zero radius turn is well-suited for orienting the mower in a certain orientation to prepare for upcoming movement consistent with a path plan.

In accordance with a second desired maneuver, which is referred to as a zero radius trim, a critical point of the mower is positioned over a reference axis of rotation. The critical point of the mowing deck may mean one or more of the following (a) an outermost projecting portion of the mowing deck with respect to a center point of the mower, (b) an outermost projecting portion of the mowing other than a discharge region, (c) an outer peripheral zone of the mowing deck with the edge of the cutting blade most proximate thereto, and (d) a radially outmost edge of one or more cutting blades of the mower. In one example, the reference axis of rotation may lie within an unmowed remnant area of a lawn or another target area. The wheels are generally oriented tangentially to an arc or a circular region about the reference axis of rotation of the mower 10 to produce a zero trim radius of the mower 10 about the reference axis of rotation. The zero trim radius is well suited for completing minor remnant or un-mowed areas of a lawn that might otherwise require multiple passes to mow with a conventional mower with a greater minimum turning radius.

In accordance with a third desired maneuver, which is referred to as a near zero radius trim, a critical point of the mower is positioned over a reference arc. The reference arc may coincide with a minimum trim radius of an object (e.g., a tree, bush, plant, pole, fire hydrant, etc.). In one example, the minimum trim radius is spaced apart from an object (e.g., the closest outer extent or outer surface of the object) by a desired degree of clearance. In another example, the guard 20 may, but need not, make contact with the object and may provide an outward force from the object. The wheels are steered to follow an arc, semi-circular or generally circular path that is generally concentric with the reference arc.

Figure 2:
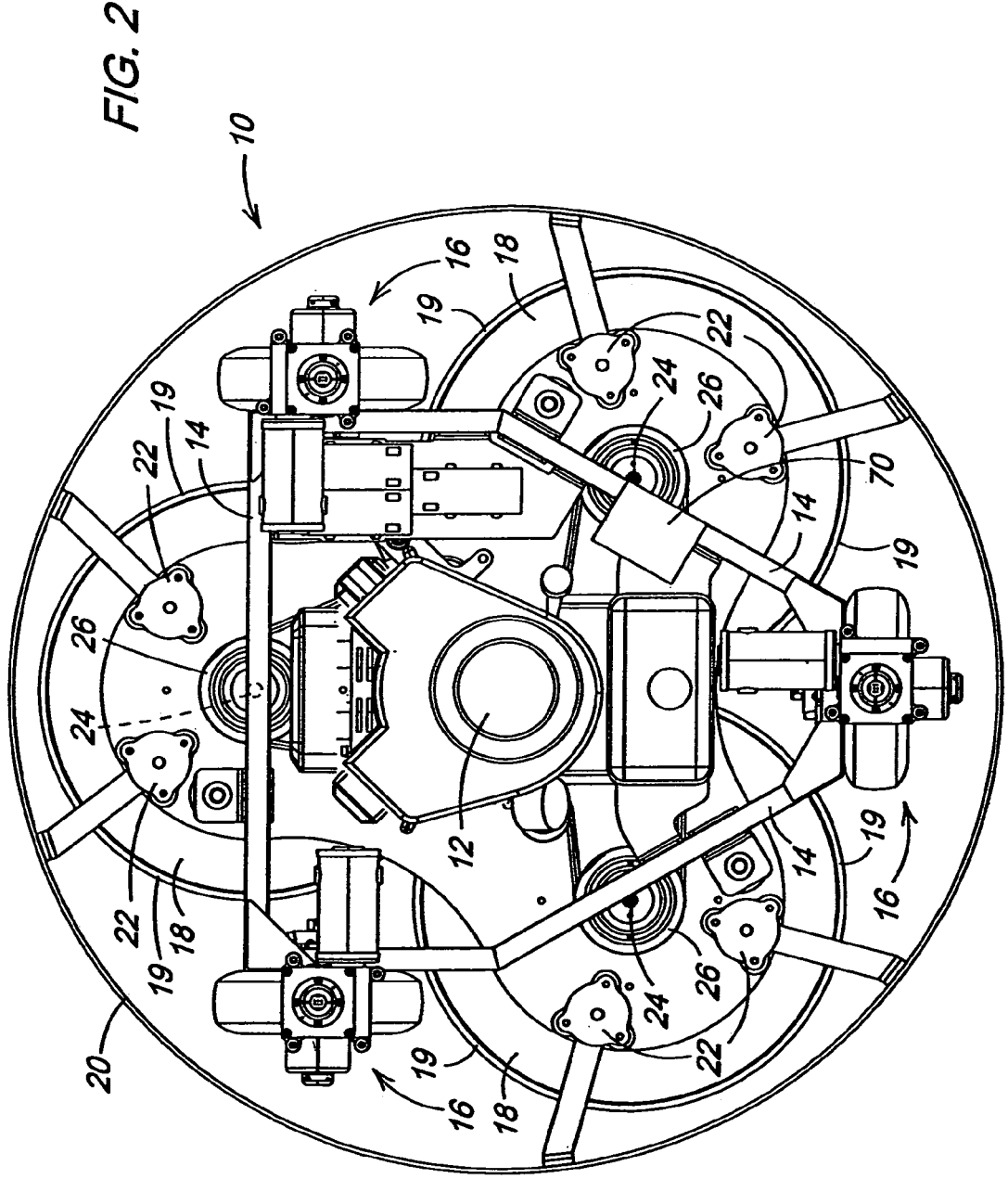
FIG. 2 is a top view of the self-propelled mower of FIG. 1.
Figure 3:
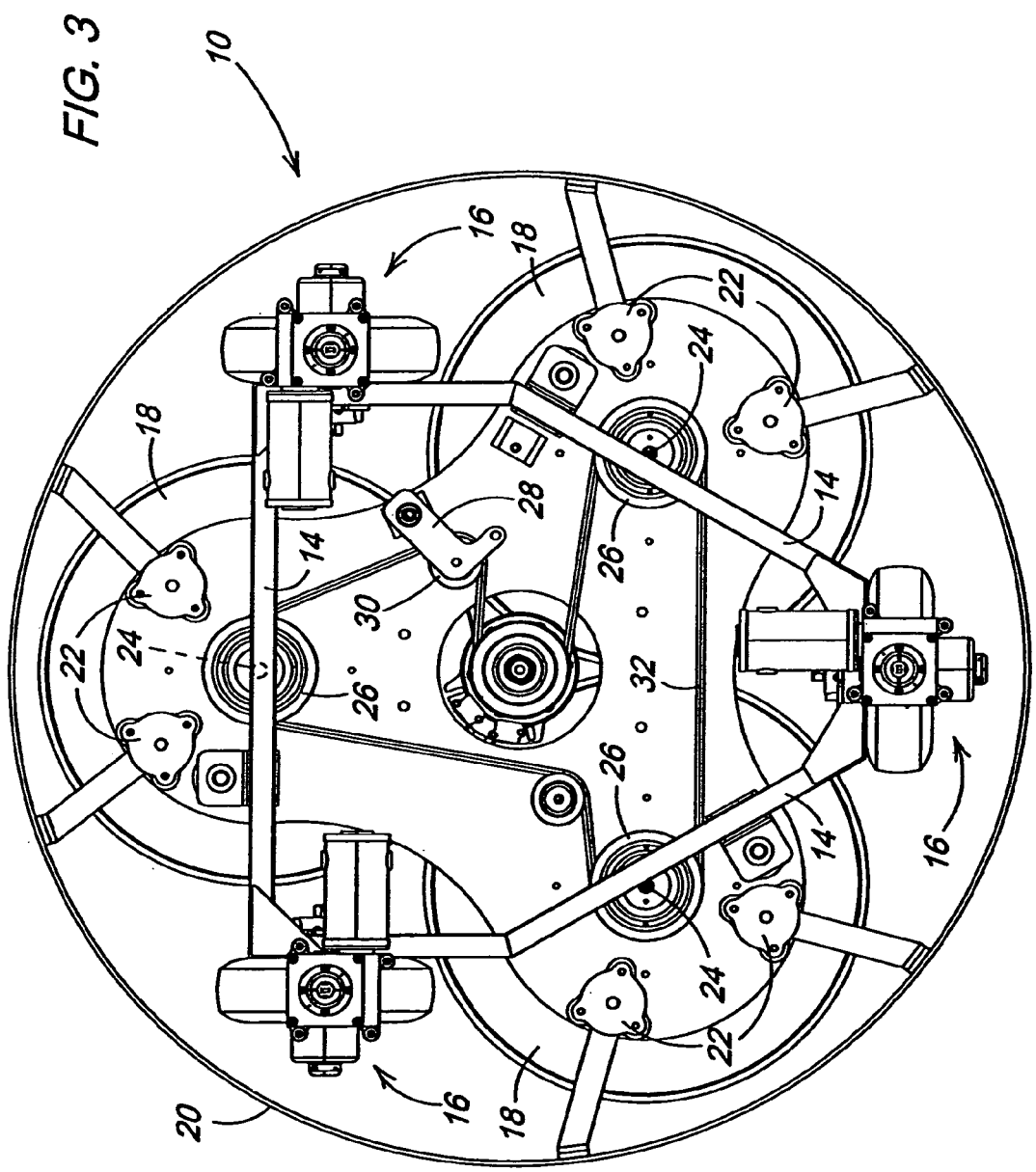
FIG. 3 is a top view of the self-propelled mower of FIG. 1 with the propulsion unit (e.g., the engine) removed to better reveal the underlying components.

FIG. 2 shows a top view of the mower 10 of FIG. 1. The indentations 19 of the deck are readily visible in section 19. Pulleys 26 are associated with the deck 18. The deck 18 generally has shafts 24 that are rotatably associated with the deck 18 via one or more bearings (not shown). A cutting blade is mounted at or near one end of the shaft 24, whereas a pulley 26 is mounted at or near an opposite end of a shaft 24. The pulleys 26 engage a belt 32. The engine 12 drives the belt 32 during operation such that the cutting blades rotate. As best illustrated in FIG. 3, the belt tension (i.e., tensile force) is controlled by a tensioner 28 that supports tension pulley 26. The tensioner 28 and the tension pulley 30 may be biased by a spring or a resilient member, for example.

FIG. 4 shows a cross-section of a wheel assembly 16. A wheel assembly 16 comprises a spindle assembly 46 that is affixed to the frame 14 (FIG. 1) or operably attached to the frame 14 via a suspension component. The spindle assembly 46 provides a housing for bearings 45 that receive a shaft 47. One end of the shaft 47 is associated with a yoke 48 and the opposite end of the shaft 47 is associated with a steering assembly 41. The yoke 48 provides mounting for a drive motor 50, a tire 52, and a drive encoder 54. The steering assembly 41 comprises a steering motor 44, a steering encoder 40, and a steering gearbox 42.

The drive encoder 54 comprises a sensor for providing a feedback signal associated with at least one of the operation, position, and movement of the drive motor 50. For example, the drive encoder 54 may provide a feedback signal indicative of the wheel rotational speed with respect to the wheel axis 113. The drive encoder 54 acts as an interface between a driver motor 50 and a master control node 62.

The steering encoder 40 comprises a sensor for providing a feedback signal associated with at least one of the operation, position, and movement of the steering motor 44. For example, the steering encoder 40 may provide a feedback signal indicative of the rotational speed of the shaft 47 with respect to the steering axis 13. The steering encoder 40 acts as an interface between the steering motor 44 and the master control node 62.

The steering gearbox 42 may provide a gear reduction that allows the steering motor 44 to turn the wheel with respect to a steering axis 13 within its operational torque range. In one embodiment, the steering gearbox 42 may provide gear reduction such that a lower torque motor (e.g., a lightweight durable motor) than otherwise possible may be used as the steering motor 44. The steering motor 44 may be of such a configuration as to allow the shaft 47 and yoke 48 to pivot freely over a desired range from zero to three-hundred and sixty degrees when no power or a certain control signal is applied to the steering motor 44. In an alternate embodiment, the steering gearbox 42 may permit the steering motor 44 to be disengaged from turning or changing the orientation of the wheel by a clutch, a gear mechanism or another mechanical or electromechanical structure.

In general, the maneuverability of the mower 10 is improved with increases in the angular range of movement of the wheel 51 about the wheel axis 13. In one embodiment, the minimum angular range is equal to or greater than ninety (90) degrees of angular displacement about the steering axis of each wheel. Those skilled in the art will appreciate that the wheel may achieve the equivalent of three-hundred and sixty (360) degrees of rotation by allowing approximately one hundred and eighty (180) degrees of rotation with slip-lock feature or rotational emulator that emulates a full three hundred and sixty (360) degrees of rotation.

FIG. 5A and FIG. 5B represent a block diagram of the electrical system 71 for the mower 10. The electrical system 71 comprises a controller 70 for controlling operation of the drive motors 50 and the steering motors 44. The drive motors 50 and steering motors 44 may be controlled individually, independently or collectively as is necessary or required to produce the desired movement (e.g., omni-maneuverable movement) of the mower 10 from rest or during movement. The controller 70 may use a feedback signal from one or more drive encoders 54 and one or more steering encoders 40 to determine control data or one or more control signals to be transmitted to the corresponding drive motors 50 and steering motors 44, respectively.

A base station 72 comprises a user interface 74 and a mission planner 76. The user interface 74 supports a user's entry, selection or input of input data for the mission planner 76 or otherwise. The input data for the mission planner 76 may include one or more of the following items: (1) the approximate dimensions of the work area or portions thereof to be mowed, (2) a description of the work area or portions thereof to be mowed, (3) location data or geographic coordinates of points defining a perimeter or boundary of the work area, (4) location data or geographic coordinates of points defining fixed obstacles, mobile obstacles, or both within or around the work area, and (5) historical or empirical data on minimization of cost of mowing or mowing time. The mission planner 76 may comprise a path planner. In one embodiment, the path planner supports generation of a path plan or selection of pre-programmed path plan for movement of the mower 10. The path plan data or other input data may be communicated from the base station 72 to the controller 70. The path plan may be subject to suspension, interruption or cancellation for safety or other reasons.

In an alternate embodiment, the user interface 74 supports tele-operation or remote control of the mower by an individual. Accordingly, the user interface may be equipped with controls, buttons, switches or other electromechanical interfaces for steering, stopping, starting, controlling, and safeguarding the mower 10.

The controller 70 and a base station 72 communicate with each other via a wireless communications device 68, a wireless modem 60 or both. The wireless communications device 68 may comprise a transceiver that modulates an electromagnetic signal with an analog or digital modulation (e.g., phase-shift keying, code division multiple access, time division multiple access, spread spectrum, frequency hopping spread spectrum or otherwise). The wireless modem 60 generally comprises a wireless modem 60.

In one configuration, the presence of both the wireless modem 60 and the wireless communications devices 68 supports redundancy in communications with a user at a base station 72. Accordingly, if either the wireless modem 60 or the wireless communications device 68 fails, becomes jammed, subject to interference or otherwise inoperable, communications may be routed to the other functioning communication device (between the wireless modem 60 and wireless communications device 60) with due consideration of transmission rate or bandwidth constraints.

In another configuration, the wireless modem 60 may comprise a wireless transceiver that operates over a lesser bandwidth than the high-bandwidth wireless communications device 68. Accordingly, the wireless communications device 68 may transmit and/or receive data at a higher transmission rate (e.g., bits per second) than the wireless modem 60. The higher transmission rate may be suitable for transmission of one or more of the following between the controller 70 and the base station 72: real-time video signals from the controller 70 to the base station 72, real-time mission plan or path planning data from the base station 72 to the controller 70, field optical guidance data (FOG data), and location data from the location-determining receiver 66 to the base station 72.

The controller 70 receives input data from a wireless modem 60 and a wireless communications device 68. The controller 70 includes a master control node 62 that receives input data from a location-determining receiver 66 (e.g., Global Positioning Receiver 66), a field optical guidance 64 (FOG) system, a wireless modem 60, and a high-bandwidth wireless communications device 68. The master control node 62 provides output data to one or more steering motor amplifiers 86 and drive motor amplifiers 88. As shown in FIG. 5B, the steering motor amplifiers 86 includes a first steering motor amplifier 200, a second steering motor amplifier 201, and a third steering motor amplifier 202. The drive motor amplifiers 88 includes a first drive motor amplifier 209, a second drive motor amplifier 210, and a third drive motor amplifier 211.

The steering motor amplifiers 86 provide suitable power signals for the steering motors 44. The driver motor amplifiers 88 provide suitable power signals or the absence thereof for controlling the rotation of the shafts associated with the drive motors 50. The steering encoders 40 provide feedback signals or feedback data for the corresponding steering motors 44 to control the angular position of each steering motor 44 at any corresponding point in time. The drive encoders 54 provide feedback signals for the corresponding drive motors 50 to provide status information to one or more drive motors 50. The status information may include one or more of the following: angular position of a motor shaft versus time, speed, torque, velocity, acceleration, and revolutions per unit time for steering motor 44, a drive motor 50, or both.

In one embodiment, the direction of travel of the vehicle may be controlled by the angular position or steered direction of orientation of each wheel. In another embodiment, the application of electrical energy to one or more drive motors 50 may allow the vehicle to be steered under certain conditions, regardless of whether the steered direction of the wheels is changed. For example, the mower 10 may be permitted to torque steer, "spin steer," or "skid steer" by providing differential torque to different wheels of the mower 10, without changing the steered direction or angular position of the wheels with respect to any reference point on the frame or another fixed part of the mower 10. The controller 70 may energize a drive motor 50 (a) to apply more revolutions to one wheel per unit time than one wheel than to another wheel of the mower 10 to turn the mower or (b) to apply rotation in opposite directions to different wheels on the vehicle to turn or spin the mower.

The steering motor amplifiers 86, the steering motors 44, and steering encoders 40 are mounted on and/or housed within the wheel assemblies 16. The drive motor amplifiers 88, the drive motors 50, and the drive encoders 54 are mounted on/or housed within the wheel assemblies 16. The first wheel assembly comprises (a) a first steering motor amplifier 200 and a first steering encoder 206 coupled to the corresponding first steering motor 203 and (b) the first drive motor amplifier 209 and the first drive encoder 215 coupled to the first drive motor 212. The second wheel assembly comprises (a) the second steering motor amplifier 201 and a second steering encoder 207 coupled to the second steering motor 204 and (b) the second drive motor amplifier 210 and the second drive encoder 216 coupled to the second drive motor 213. The third wheel assembly comprises (a) the third steering motor amplifier 202 and the third steering encoder 208 coupled to the third steering motor 205 and (b) the third drive motor amplifier 211 and the third drive encoder 217 coupled to the third drive motor 214. In this paragraph, "coupled" refers to an electrical or electromagnetic connection.

An electrical supply system 78 may include batteries 80 and an electrical charging system 82. The batteries 80 may be charged by an alternator, a generator, or a magneto driven by the mechanical power of the propulsion unit 12 (e.g., engine), for example. The electrical supply system 78 may be associated with a power distribution board 84 that routes electrical energy from the electrical supply system to various components of the controller 70 and the electrical system 71. For example, the electrical supply system 78 may provide electrical energy to the steering motor amplifiers 86 and the drive motor amplifiers 88.

In an alternate embodiment, the controller 70 may further control hydraulic, mechanical, cable or electromechanical brakes that stop the rotation of one or more wheels of the mower. In another alternate embodiment, one or more drive motors are selected to resist rotation of their shafts if electrical energy or voltage potential is not applied to such drive motors and the controller 70 is configured to withdraw such electrical energy to brake (e.g., stop or slow) the mower 10 as required.

Figure 6:
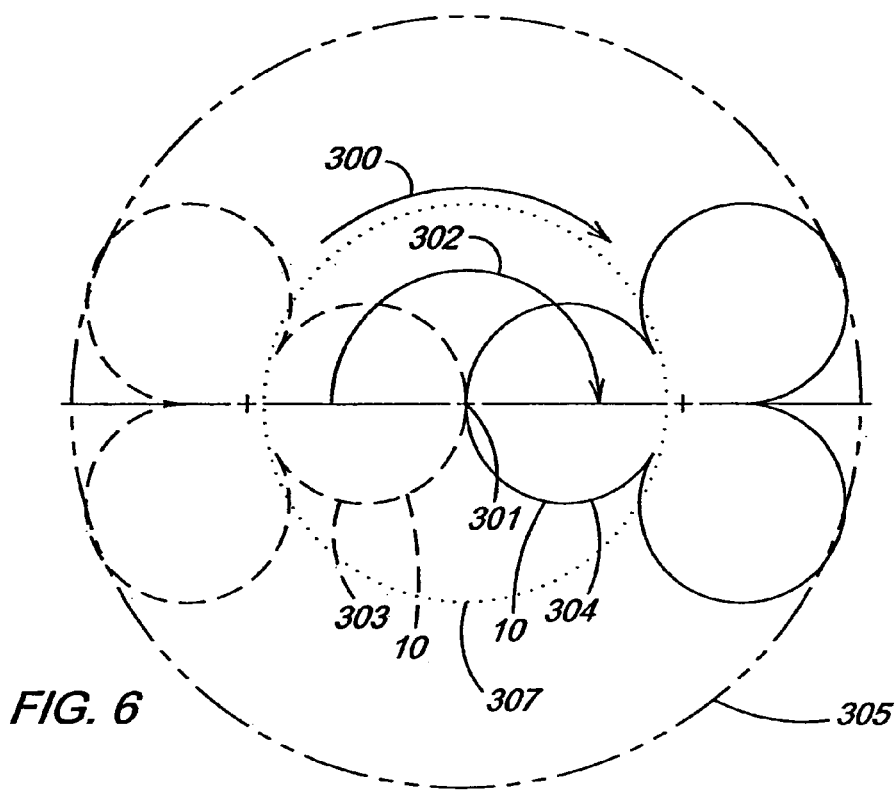
FIG. 6 is a diagram that illustrates a top view of an approximately zero radius trim maneuver.

FIG. 6 shows a top view of the mower 10 completing an approximately zero radius trim maneuver. Each cluster of three non-concentric circles is suggestive of a top view of a deck of the mower 10. A first position of the mower 10 at a first time is shown by the cluster of three non-concentric circles in dashed lines 303, whereas the second position of the mower 10 at a second time is illustrated by the solid lines 304. The second time may be later than the first time. The arrow 300 shows that the mower 10 is rotating in a clockwise direction about a reference axis 301 of rotation from a first position to a second position. Although the mower 10 has rotated approximately one-hundred and eighty degrees 302 as illustrated, the approximately zero radius trim maneuver may be made from greater than zero degrees to approximately three-hundred and sixty degrees.

Alternatively, the mower 10 may make multiple revolutions about the reference axis 301 during which the cutting blade is successively lowered to trim high grass or vegetation, for instance.

In order to complete the zero trim circle of FIG. 6, each wheel of the mower 10 is oriented generally orthogonal to a corresponding radius about the reference axis 301. In other words, each wheel of the mower is oriented generally tangential to a corresponding arc (e.g., a portion of circle 305 or circle 307) formed by the radii about the reference axis 301. The mower 10 orients the wheels by energizing or de-energizing the steering motors 44 associated with the wheel assemblies. In one embodiment, each wheel may be locked in position when it reaches a generally tangential position to the arcs formed by the radii about the reference axis 301. Energy may be applied to the drive motors 50 of one or more of the outer wheels to drive the mower 10 on the ground to achieve the desired degree of rotation of the mower 10 from greater than zero to three-hundred and sixty degrees or more.

Figure 7:
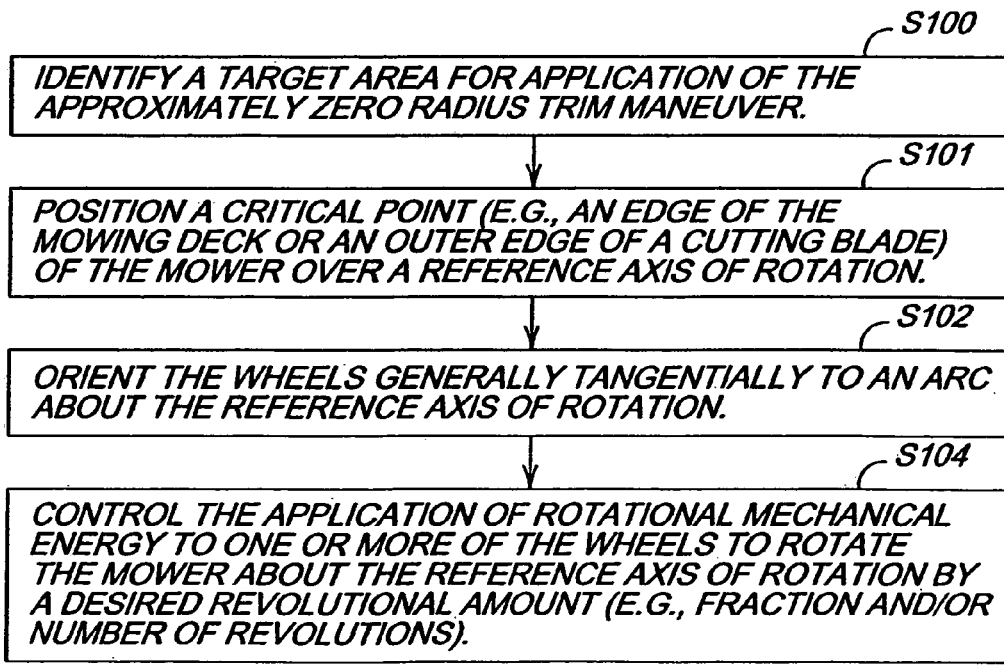
FIG. 7 is a method for making an approximately zero radius trim maneuver.

FIG. 7 is a method for executing an approximately zero radius trim maneuver of a mower 10. FIG. 6 provides an illustrative example of an approximately zero radius trim maneuver executed in accordance with the method of FIG. 7. The method of FIG. 6 begins in step S100.

In step S100, a target area is identified for application of the approximately zero radius trim maneuver. The target area may be designated as a portion of a work area to be serviced by the mower 10. With respect to a zero radius trim, the target area may represent a remnant unmowed region of a lawn or another work area. The remnant unmowed region may comprise one or more remaining uncut central portions of a lawn, which results from a perimeter tracking path plan in which the mower follows an outer perimeter of the uncut vegetation (e.g., grass) of the work area for one or more successively inward passes to generate a mowed outer region and one or more unmowed central regions. Multiple unmowed central regions may be present where an obstacle, such as a building, covers a portion of the work area.

In step S101, the controller 70 positions a critical point of the mowing deck or an outer periphery (e.g., bumper) over a reference axis or substantially adjacent thereto a reference axis 301.

In step S102, the controller 70 orients each wheel generally tangentially to a corresponding arc about the reference axis 301 of rotation. The corresponding arc may define at least a portion of the first circle 305 and a second circle 307 (of lesser radius than the first circle), for example. Up to two wheels of the mower 10 may overlie or track at least a portion of the second circle 307 depending upon the relative position and geometry of the wheel assemblies, whereas one wheel overlies the first circle 305. In alternate configurations, each wheel may overlie or track a corresponding arc, circle or semi-circle.

In step S104, the controller 70 controls the application of rotational mechanical energy to one or more of the wheels to rotate the mower 10 about the reference axis 301 of rotation by a desired revolutional amount (e.g., fraction and/or number of revolutions).

FIG. 8 shows a top view of the mower 10 completing a near zero radius trim maneuver or a greater than zero radius trim maneuver. Each cluster of three non-concentric circles is suggestive of a top view of a deck of the mower 10. A first position of the mower 10 at a first time is shown by the cluster of three non-concentric circles in dashed lines 503, whereas the second position of the mower 10 at a second time is illustrated by the solid lines 504. The second time may be later than the first time.

A minimum radius 552 is selected around the object 550. If the minimum radius 552 were rotated about a center point associated with the object, it would form an reference arc 554. The reference arc 554 may have a traversed portion 556 (indicated by the solid curved line) that is traversed by a critical point of the mower 10 and an un-traversed portion 558 (indicated by the dashed line) that is not traversed by the critical point of the mower 10. The critical point of the mowing deck may mean one or more of the following (a) an outermost projecting portion of the mowing deck with respect to a center point of the mower, (b) an outermost projecting portion of the mowing other than a discharge region, (c) an outer peripheral zone of the mowing deck with the edge of the cutting blade most proximate thereto, and (d) a radially outmost edge of one or more cutting blades of the mower.

The wheels of the mower are aligned tangentially to respective arcs about the object 550. In one embodiment, the minimum radius 552 is selected such that an edge or periphery or critical point of the mowing deck is generally tangential to the object 550 or generally tangential to the object 550 with a minimal clearance zone to avoid abrading or bumping into the object.

The arrow 300 shows that the mower 10 is rotating in a clockwise direction about an object 550 from a first position to a second position. Although the mower 10 has rotated approximately one-hundred and eighty degrees as illustrated, the approximately zero radius trim maneuver may be made from greater than zero degrees to approximately three-hundred and sixty degrees.

FIG. 9 is a method for executing a near zero radius trim or greater than zero radius trim maneuver of a mower. FIG. 8 provides an illustrative example of a greater than zero radius trim maneuver executed pursuant to the method of FIG. 9. The method of FIG. 9 begins in step S500.

In step S500, a target area is identified for application of the near zero radius trim or greater than zero radius trim maneuver. The target area may be designated as a portion of a work area to be serviced by the mower 10. With respect to a near zero radius trim or greater than zero radius trim maneuver, the target area may represent an unmowed region of vegetation around an object 550 (e.g., a pole, tree, fire hydrant, a stake, bush, a plant or otherwise). A minimum radius 552 is selected around the object that provides sufficient clearance (one no clearance if desired) between the object 550 and the mower 10. For example, the sufficient clearance may depend upon one or more of the following factors: (a) maintaining adequate physical clearance between a periphery (e.g., guard 20) of the mower 10 and the object 550 to avoid bumping, scuffing, abrading or other contact with the object, (b) maintaining a sufficiently close cut to the object as influenced by the placement and configuration of the cutting blades with respect to the deck and the outer periphery of the mower 10, (c) aligning an edge or periphery of the mowing deck to be generally tangential or otherwise adjacent to the object 550 without contacting or abrading the object 550, and (d) contacting the object 550 with the guard 20 or with rollers, elastomeric bumpers, or other non-destructive means.

In step S501, the controller 70 positions a critical point of the mowing deck or an outer periphery of the mower over the reference arc 554 or substantially adjacent to the reference arc 554. For example, the critical point of the mowing deck overlies or tracks the traversed portion 556 of the reference arc 554.

In step S502, the controller 70 aligns the steered direction of the wheel to be generally tangential to two or more respective arcs that are generally concentric with respect to the reference arc 554. The steered direction means the angular orientation of a respective wheel with respect to a corresponding steering axis of the wheel assembly. FIG. 8 illustrates the reference arc 554 as a traversed portion 556 (indicated by the solid line) and an untraversed portion 558 (indicated by a dotted line). The traversed portion 556 may extend any desired amount (e.g., angular or rotational displacement) necessary to trim the vegetation around the object 550, while avoiding obstacles. For example, the traversed portion 556 may be semi-circular or generally circular.

In an alternate procedure, step S502 may be replaced by the controller 70 aligning the steered direction of orientation of the wheels with respect to a reference axis associated with the object 550 or lying within the object 550.

In step S504, the controller 70 controls the application of rotational mechanical energy to one or more of the wheels to rotate the mower 10 about the object by a desired fraction and/or number of revolutions.

Figure 10:
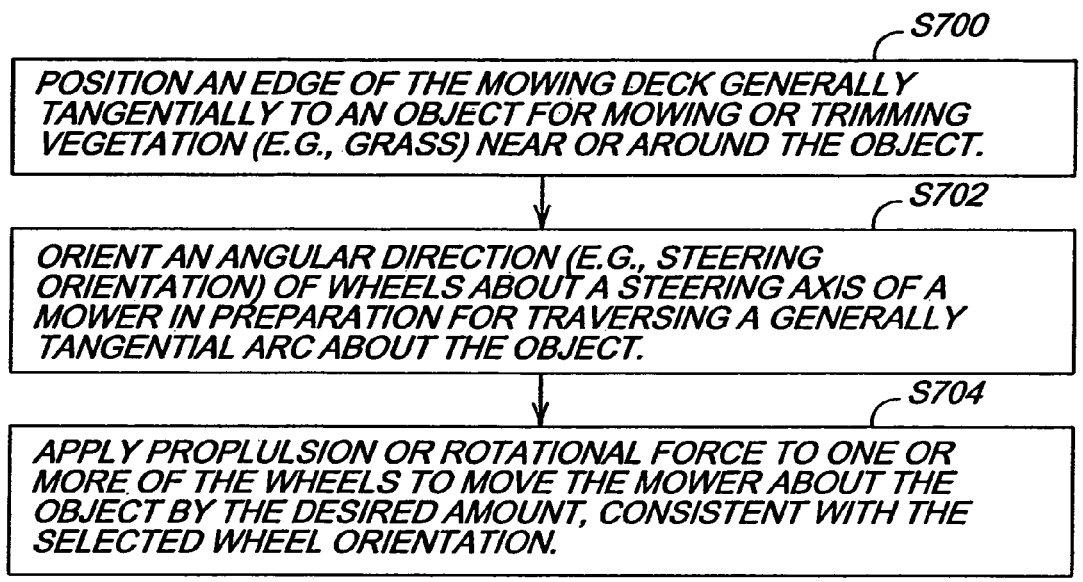
FIG. 10 is an alternate method for making a near zero radius or greater radius trim maneuver.

The method of FIG. 10 represents one illustrative technique for executing a near zero radius trim maneuver or other close trimming around an object 550. The method FIG. 10 illustrates an alternative technique to FIG. 9 for executing a near zero radius trim maneuver. The method of FIG. 10 begins in step S700.

In step S700, an edge or periphery of the mowing deck (e.g., including guard 20) is positioned generally tangentially to an object 550 for mowing or trimming vegetation (e.g., grass) near or around the object 550. In one example, the mower 10 is moving along a global path plan and reaches a proximate point of the path plan that is closest to the object, where the controller 70 deviates from the global path plan to orient the wheels of the mower 10 in any possible (e.g., the most efficient) steering orientation to bring the mowing deck in proper alignment with the object 550 (e.g., over the shortest possible time or traversed distance of the mower 10).

In step S702, after the mowing deck is aligned with the object 550 or a clearance zone about the object 550, the controller 70 orients an angular direction (e.g., the steering orientation) of the wheels (e.g., all of the wheels) in preparation for traversing a generally tangential arc about the object 550. The generally tangential arc may comprise a substantially curved portion or the entire portion of an ellipsoid, an ellipse, a semi-ellipse, a semi-circle, an ovoid, and a circle.

In an alternate technique for carrying out step S702, if it is not desired for the mower 10 to track a generally circular or elliptical shape around the object 550, the controller 70 may dynamically change a steering orientation of the wheels to track a substantially curved or substantially linear segment of a desired contour around the object. The desired contour around the object 550 may be defined by a combination of generally linear segments, non-linear segments, curved segments, or other contours.

In step S704, the controller 70 applies propulsion or rotational force to one or more of the wheels to move the mower 10 about the object 550 by the desired amount, consistent with selected wheel orientation of step S702. Following step S704, the controller 70 may realign the position of the mower to be coincident with or to otherwise merge with the global path plan. For instance, the mower 10 may return to the global path plan at the proximate point to continue mowing from the proximate point to provide an efficient transition between the near zero radius trim maneuver and the global path plan.

FIG. 11 illustrates the mower 10 moving in an approximately zero radius turn, in which the mower 10 spins on a reference axis 301 at a desired point within the work area. The mower 10 is represented by the cluster three non-concentric circles shown at two discrete time instants during its revolution about the axis 301. At a first time the mower is at a first position as indicated by the dashed lines 311 and at a second time the mower is at a second position as indicated by the solid lines 309. The displacement between the first and second positions represents a generally orthogonal left (counterclockwise) turn, as illustrated by right angle 399, although other types and directions of turns are possible and fall within the scope of the invention. The mower 10 may make a factional revolution or any number of revolutions about the axis 301. To carry out the zero radius turn of FIG. 11, three of the wheels are oriented in a generally tangential manner with respect to a circular zone 305 about the axis 301. Energy is applied to one or more of the drive motors 50 to spin the mower 10 by the desired angular amount 22.

FIG. 12 is a method for making an approximately zero radius turn maneuver. FIG. 11 is one illustrative example of carrying out the method of FIG. 12. The method of FIG. 12 begins in step S108.

In step S108, a controller 70, a mission planner 76 or both define a reference axis 301 of rotation at a desired point along a path segment of the mower 10. The desired point may represent a point where the mower 10 could service the work area or extending beyond the work area without the mower or one or more of its cutting blades extending beyond a boundary (e.g., outer perimeter) of the work area by more than an allowable tolerance.

In step S110, the wheels are oriented generally tangentially to a circular region 305 about the reference axis 301 of rotation.

In step S112, rotational mechanical energy is applied to one or more of the wheels to rotate the mower by a desired angular amount (e.g., 90 degrees for a generally orthogonal turn, to the left (counterclockwise) or the right (clockwise)). For example, drive motors 50 may apply rotational energy to the wheels.

In step S114, the controller 70 stops the application of rotational energy to one or more of the wheels before or upon completion of rotation to achieve rotation of a fixed reference point on the mower 10 by the desired angular amount.

In step S116, the wheels 51 of the mower 10 are reoriented toward the steered direction of a next desired path segment.

Figure 13:
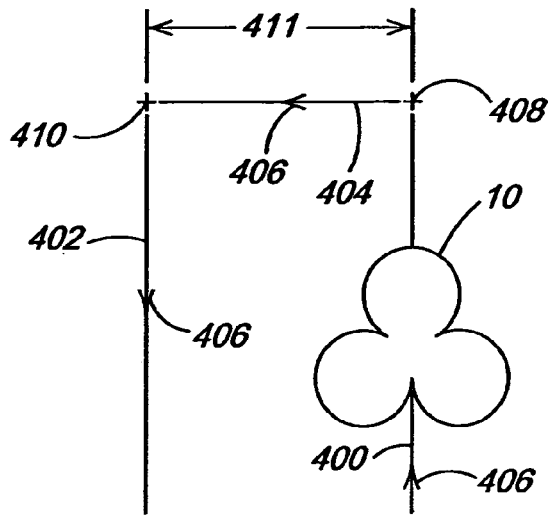
FIG. 13 is a diagram of a top view of a path segment of a mower at an end of one row and the start of another row.

FIG. 13 illustrates the mower 10 traversing over at least a fraction of a work area. The mower 10 travels in a direction indicated by the arrow heads 406. The work area includes a first row 400 traveled in a first direction that is spaced apart from a second row 402 traveled in a second direction, that is generally opposite the first direction. The rows (400, 402) may be spaced apart by an amount less than one mower width or one cutting swath of the mower 10 to allow for cutting overlap between adjacent rows (400, 402). The first row 400 and the second row 402 are connected by a transverse section 404 or transition section, which is generally transverse with respect to the first row 400 and second row 402. The first row 400 forms a generally right angle with the traverse section 404 and the second row 402 forms a generally right angle with the transverse section 404.

The mower 10 may track the first row 400, followed by execution of a first zero radius turn of approximately ninety degrees at the end of the first row 400 at a first axis 408. The first axis 408 is located at the intersection of the first row 400 and the transverse section 404. The mower 10 moves in a generally linear direction along the traverse section 404 of length 411 until it reaches a termination point of the traverse section 404 and makes a second zero degree radius turn of approximately ninety degrees at a second axis 410. The mower 10 is aligned with the second row 402 and moves in a generally linear direction along the second row 402, and so forth, until the desired portion of the work area is covered.

Figure 14:
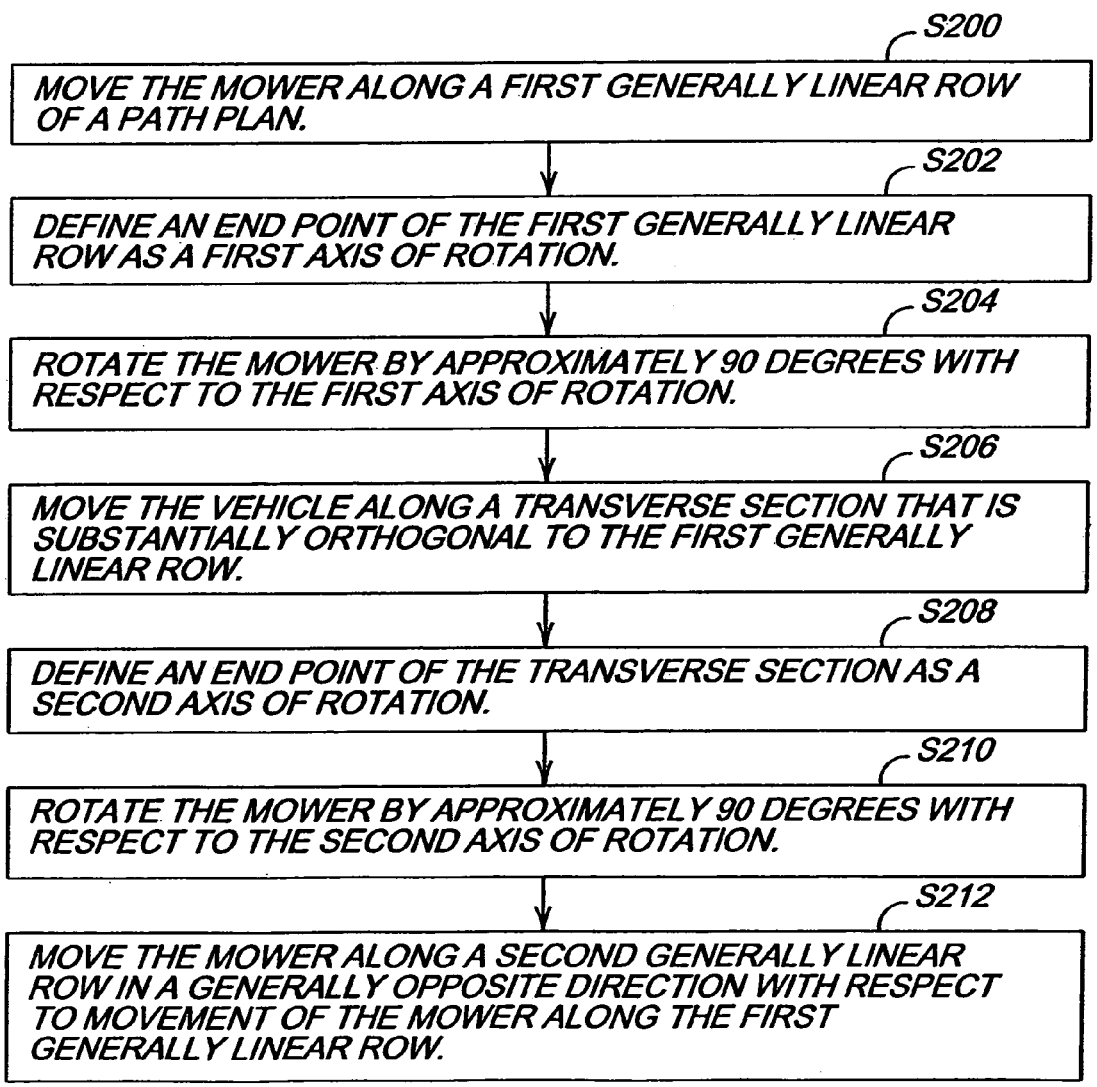
FIG. 14 is a method for mowing a work area with a self-propelled mower.

FIG. 14 illustrates the mower 10 following a path plan to traverse or cover a work area. FIG. 13 provides an illustrative example of the mower following a path in accordance with the method of FIG. 14. The path plan of FIG. 14 may represent back and forth movement of the mower 10 along generally parallel rows within a generally polygonal (e.g., rectangular) work area, where adjacent rows are interconnected by one or more generally orthogonal turns of the mower. The method of FIG. 14 begins in step S200.

In step S200, the mower 10 moves along a first row 400 of a path plan in a first direction (e.g., indicated by the direction of arrowhead 406). For example, the mower moves along a first generally linear row as the first row 400.

In step S202, the mission planner or controller 70 defines an end point of the first row 400 as a first axis 408 of rotation. For example, the end point of the first row may be selected such that an outer cutting edge of a cutting blade of the mower, an outer edge of a mowing deck, or guard 20 is generally coextensive with a boundary or perimeter of the work area.

In step S204, the drive motors 50, the drive encoder 54, and the controller 70 cooperate to rotate the mower by approximately ninety degrees with respect to the first axis 408 of rotation. The method of FIG. 14 may be used to execute the generally right angle turn of the mower in step S204.

In an alternative procedure for executing step S204 that is referred to as "crabbing over" or a modified turn, the drive motors 50, the drive encoder 54, and the controller do not rotate the mower by approximately ninety degrees, but merely change the orientation of the wheels by approximately ninety degrees. For example, at the end point of the first row 400, the controller stops or pauses the mower, while simultaneously rotating the wheels by approximately ninety degrees, prior to proceeding along in a new direction in step S206 that is generally orthogonal to the first row 400.

In step S206, the mower 10 moves along a transverse section 404 that is substantially orthogonal to the first row 400. The length 411 of the transverse section may be selected to provide a proper generally parallel spacing between the first row 400 and the second row 402, in which the swath or cut width of the mower is permitted to overlap. Accordingly, the centerline of each row is generally spaced apart by less than one-half of the swath or cut width of the mower to minimize overlap and reduce energy consumption of the mower.

In step S208, the mower 10 defines an end point of the transverse section as a second axis 410 of rotation. In one embodiment, the end point lies at the end of the length of the transverse section 404.

In step S210, one or more drive motors 50 rotate the mower 10 by approximately ninety degrees with respect to the second axis 410 of rotation. The method of FIG. 12 may be used to execute the generally right angle turn of step S210.

In an alternative procedure for executing step S210 that is referred to as "crabbing over" or a modified turn, the drive motors 50, the drive encoder 54, and the controller 70 do not rotate the mower by approximately ninety degrees, but merely change the orientation of the wheels by approximately ninety degrees. For example, at the end point of the transverse section 404, the controller stops or pauses the mower, while simultaneously rotating the wheels by approximately ninety degrees, prior to proceeding along in a new direction in step S212 that is generally orthogonal to the transverse section 400.

In step 212, one or more drive motors 50 move the mower 10 along a second generally linear row 402 in a generally opposite direction (e.g., indicated by arrowhead 406) with respect to the first direction.

FIGS. 15A through 15C, inclusive, illustrate the steered direction of the wheels 51 of the mower 10 oriented in a linear mode. In a linear mode, the mower 10 travels in a generally linear path and the directions of the wheels 51 are generally parallel to each other. FIG. 15A illustrates a linear mode in which the mower 10 moves forward or backwards. FIG. 15B illustrates a linear mode in which the mower 10 moves sideways. FIG. 15C illustrates a linear mode in which the mower 10 moves diagonally.

FIG. 16 illustrates an arc mode in which the mower 10 turns with reference to a reference point 161 or reference axis that is spaced apart from the mower 10. Here, in FIG. 16 the reference point 161 or reference axis does not lie beneath the mowing deck 18. In an arc mode, the mower follows a path or path segment 167 of an arc, a semi-circle, a semi-ellipse, an ellipse, or a circle with reference to the reference point 161. The path segment 167 is indicated by dotted curved line. The arc mode may be accomplished with a constant radius (from each wheel 51 to the reference point 161) over time to produce a circle or semi-circular figure.

Referring to FIG. 16, a first radius 163 has a first length between a first wheel 151 and the reference point 161; a second radius 164 has a second length between a second wheel 251 and the reference point 161; a third radius 165 has a third length between a third wheel 351 and the reference point 161, where the at least two of the first length, the second length, and the third length are different from one another. The first wheel 151 may track a first arc 168 having the first radius 163; the second wheel 251 may track a second arc 170 having the second radius 164; the third wheel 351 may track a third arc 169 having a third radius 165. If the first radius 163, the second radius 164 and the third radius 165 (collectively radii) are kept constant, the mower 10 follows a generally semi-circular path or generally circular path. The wheels 51 (including the first wheel 151, the second wheel 251, and the third wheel 351) may be aligned generally perpendicular to their corresponding radii, which is equivalent to tangential alignment with their corresponding arcs.

In an alternate embodiment, one or more of the radii from the reference point are varied over time to produce an elliptical path or a spiral path or other curved paths of the mower.

FIG. 17 illustrates a rotating mode in which the mower 10 rotates about a center point 166 (of the mower 10) that overlies or coincides with a reference point 161. The first radius 172 is located between the reference point 161 and the first wheel 151, the second radius 173 is located between the reference point and the second wheel 251, the third radius 174 is located between the reference point and the third wheel 351. As illustrated in FIG. 17, the first radius 172 is generally orthogonal to the second radius 173; the second radius 173 is generally orthogonal to the third radius 174. The wheels 51 (including the first wheel 151, the second wheel 251, and the third wheel 351) may be aligned generally perpendicular to their corresponding radii, which is equivalent to tangential alignment with their corresponding arcs. Accordingly, the wheels cover or scribe a generally circular or semi-circular shape 175 about the reference point 161. The semi-circular shape 175 is indicated by the dashed lines.

The rotating mode may be combined with the linear mode or the arc mode to produce a linear-rotating mode or an arc-rotating mode. In the linear-rotating mode, the mower moves along a linear progression and the mower pauses or coasts to rotate with respect to at least one stationary or mobile reference point along the linear progression by an angular displacement over time. The angular displacement may be selected to prepare the mower for an upcoming or next maneuver. In the arc-rotating mode, the mower moves along a curved progression and the mower pauses or coasts to rotate with respect to at least one stationary or mobile reference point along the linear progression by an angular displacement over time. The angular displacement may be selected to prepare the mower for an upcoming or next maneuver. For instance, the rotating mode, the linear-rotating mode, or the curved-rotating mode may be used to align a critical point of the mowing deck with a reference point or axis for a subsequent or planned trimming operation.

Figure 18:
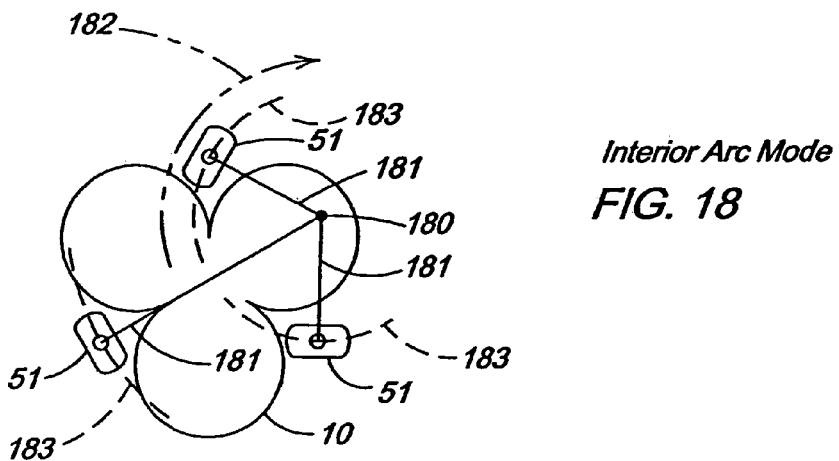
FIG. 18 is a plan view of the mower that shows illustrative angular orientations of the wheels with respect to the steering axes for an interior arc mode.

FIG. 18 illustrates an interior arc mode in which the reference point 180 lies within or underneath a perimeter of the mower 10. The wheels 51 are aligned perpendicularly to radii 181 about the reference point 180. The radii 181 are indicated by the solid lines extending between the reference point 180 and the wheels 51. The mower 10 follows an arc or curved path 182 indicated by the dotted line. Each wheel 51 follows or tracks the arc or curved path indicated by the dashed lines 183.

Figure 19:
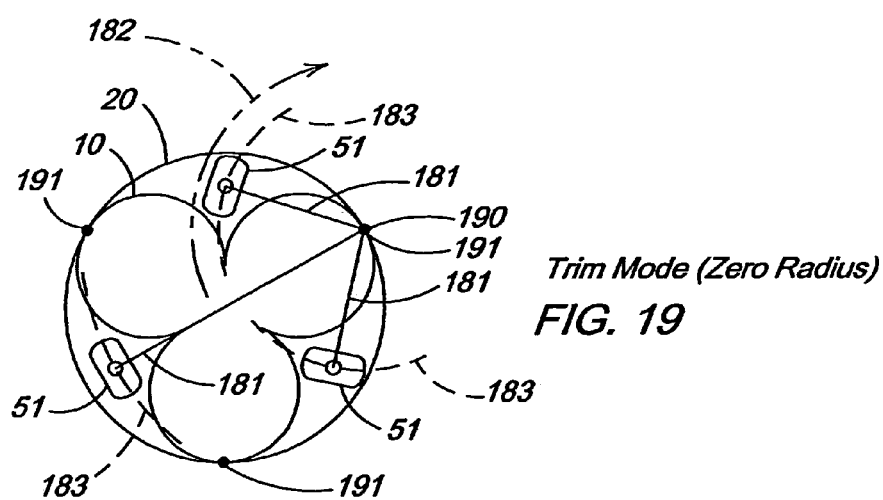
FIG. 19 is a plan view of the mower that shows illustrative angular orientations of the wheels with respect to the steering axes for a trim mode with approximately zero trim radius or near zero trim radius.

The trim mode of FIG. 19 is similar to the interior arc mode of FIG. 18, except reference point 191 of FIG. 19 is located differently than reference point 180 of FIG. 18. Like numbers indicate like elements in FIG. 18 and FIG. 19.

FIG. 19 illustrates a zero radius trim mode or near zero radius trim mode in which the reference point 191 is coextensive with or adjacent to a critical point 190 on the outer periphery of the mower. A critical point (e.g., 190 or 191) of the mowing deck may mean one or more of the following (a) an outermost projecting portion of the mowing deck with respect to a center point of the mower, (b) an outermost projecting portion of the mowing other than a discharge region, (c) an outer peripheral zone of the mowing deck with the edge of the cutting blade most proximate thereto, and (d) a radially outmost edge of one or more cutting blades of the mower. Although the invention may be practiced with a mowing deck with only one critical point 190, the mowing deck may have other critical points 191 besides the critical point 190. The mowing deck of FIG. 19 has three critical points (190, 191), for example.

Figure 20:
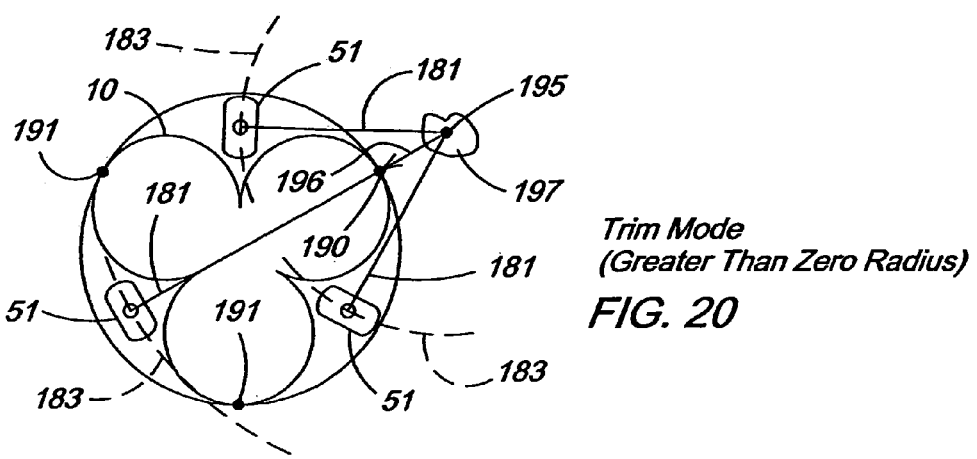
FIG. 20 is a plan view of a the mower that shows illustrative angular orientations of the wheels with respect to the steering axes for a trim mode with greater than zero trim radius.

The trim mode of FIG. 20 is similar to the trim mode of FIG. 19 and the interior arc mode of FIG. 20, except the critical point 190 of FIG. 20 is spaced apart from the reference point 195 by a radial clearance 196. Like reference numbers in FIG. 18 through FIG. 20 indicate like elements.

FIG. 20 represents a greater than zero radius trim mode in which the reference point 195 lies outside of the mower 10 by a radial clearance 196 to avoid striking or damaging an object 197 (or to contact the object in a controlled manner). The reference point 195 may be coincident with or adjacent to an object 197 such that a suitable clearance radius is established between an outer periphery of the object 197 and the outer periphery of the mower 10.

FIG. 21 shows an illustrative data structure for path plan data. In accordance with FIG. 21 the path plan data has two hierarchical levels: (1) path segments identifiers and (2) path segment data. The path segment data depends upon a corresponding path segment identifier. In one embodiment, the path segment identifier represents a parent data type with respect to path segment data; the path segment data represents a child data type to the path segment identifier.

In the illustrative data structure of FIG. 21, the first path segment identifier is associated with a first starting coordinate $(X_1, Y_1)$, a destination coordinate $(X_2, Y_2)$, a mode (e.g., linear, arc, spiral, rotating, trim, or combination)$(M_1)$, and reference point coordinates (where applicable to the relevant mode, e.g., for arcs or trim modes)$(R_1)$.

The second path segment identifier is associated with a first starting coordinate $(X_2, Y_2)$, a destination coordinate $(X_3, Y_3)$, a mode (e.g., linear, arc, spiral, rotating, turn, crab-turn, or combination)$(M_2)$, and reference point coordinate (where applicable)$(R_3)$. It should be noted that the ending coordinate of the first path segment identifier is the same as the starting coordinate of the second path segment identifier, such that the first path segment and the second path segment can form part of a continuous path plan for the mower.

In the example, the Nth path segment identifier is associated with a first starting coordinate $(X_N, Y_N)$, a destination coordinate $(X_{N+1}, Y_{N+1})$, a mode (e.g., linear, arc, spiral, rotating, or combination)$(M_N)$, and reference point coordinate (where applicable)$(R_N)$. Although N may equal any whole number or positive natural number that is greater than two in the example of FIG. 21, it is possible to execute the invention with other values of N. It should be noted that the ending coordinate of the previous path segment identifier (e.g., the N−1 path segment identifier) is the same as the starting coordinate of the Nth path segment identifier, such that the previous path segment and the Nth path segment can form part of a continuous path plan for the mower.

FIG. 22 represents an illustrative path plan consistent with the path plan data structure presented in FIG. 23. The path plan follows is executed in a work area 421 with one or more obstructions. Here, for illustrative purposes, the obstructions include a building 419 and an object 420. In practice, the path plan may differ from the illustrative example of FIG. 22 to accommodate a myriad of possible work areas and an assortment of obstructions of various quantities, size, and scope.

The mower 10 follows a first path segment 407, which extends from $X_1, Y_1$ to $X_2, Y_2$, in a linear mode. The second path segment 408 may have the same starting and destination point of $X_2, Y_2$. The second path segment 408 is conducted in a rotating mode in which an approximately ninety (90) degree clockwise turn is made. The mower 10 follows the third path segment 409, which extends from $X_2, Y_2$ to $X_3, Y_3$, in a generally linear mode. The fourth path segment 410 has the same starting and destination point of $X_3, Y_3$. The fourth path segment 410 is conducted in a rotating mode in which the mower 10 makes an approximately ninety (90) degrees clockwise turn. The mower 10 follows a fifth path segment 411, which extends from $X_3, Y_3$ to $X_4, Y_4$ in a linear mode. For the sixth path segment 413, the mower 10 changes to a trim mode or arc mode in which the mower trims in an arc about a reference point 417 (associated with object 420). The sixth path segment 413 may start at $X_4, Y_4$ and end at $X_4, Y_4$ to define the sixth path segment 413 as an intervening arc, or circle executed between the starting and the end coordinates.

The mower follows a seventh path segment 414 from $X_4, Y_4$ to $X_5, Y_5$ in a linear mode. In an eighth path segment 415, the mower 10 follows an arc path of a constant or variable radius with respect to reference point 418 from a starting point $X_5, Y_5$ to destination point $X_6, Y_6$. The critical point of the mower (e.g., mowing deck) faces the area to be trimmed and is aligned with a curved border (e.g., which stretches along one side of the building 419), regardless of whether the border is convex or concave. Accordingly, in one illustrative example, the mower may reorient the critical point of the mower 10 by altering the mode of the seventh or eight path segment to a rotating-linear mode or a rotating curved mode, respectively. After the eight path segment 415, the mower follows a ninth path segment 416, which extends from at $X_6, Y_6$ to $X_7, Y_7$.

Advantageously, the mower of the invention is highly maneuverable and has a lower center of gravity than many other mowers of comparable cutting width (e.g., riding mowers that accommodate an on-board operator). In one configuration, the mounting of the engine, drive motors 50, the steering motors 44, and the lack of a human operator on-board the mower 10 facilitate a generally low center of gravity of the mower to reduce the possibility of tipping when mowing sloped terrain.

The maneuverability of the mower 10 supports flexible path definition, which can be used to vary paths to reduce soil compaction, vegetation compaction or turf compaction. The controller provides accurate steering angles and wheel speed for minimizing tire scuffing and turf damage.

Having described the preferred embodiment, it will become apparent that various modifications can be made without departing from the scope of the invention as defined in the accompanying claims. For example, two of the three wheels of the mower may be steered and driven to reduce costs of the mower. The remaining wheel could be unsteered, not driven or both. In another example, a high velocity air blower may be attached to the mower for blowing grass clippings, leaves or other debris from the ground or paved areas.

What is claimed is:

1. A mower comprising:
 a plurality of wheel assemblies, each wheel assembly associated with a corresponding wheel, a corresponding electrical steering motor, and a corresponding electrical drive motor,
 a controller for controlling a steered direction of the corresponding wheel via the corresponding electrical steering motor and application of electrical energy to the corresponding electrical drive motor consistent with maneuvering the mower in accordance with a movement mode in any desired direction along the ground;
 a propulsion unit for rotating at least one cutting blade;
 a mowing deck for housing the at least one cutting blade, the mowing deck having indentations to provide a spatial zone for the plurality of wheel assemblies, the mowing deck comprising three generally semi-circular sections having corresponding centerpoints that are substantially equidistant to a geometric center point of the mower; and
 a frame for supporting the plurality of wheel assemblies, the propulsion unit, and the mowing deck.

2. The mower according to claim 1 wherein the movement mode is selected from the group consisting of a linear mode, an arc mode, a rotating mode, and a trim mode.

3. The mower according to claim 1 wherein the movement mode comprises a linear mode in which all of the wheels are oriented parallel to one another with respect to their respective steering axes.

4. The mower according to claim 1 wherein the movement mode comprises a rotating mode in which the wheels are oriented generally tangential to a circular region about the mower.

5. The mower according to claim 1 wherein the movement mode comprises an arc mode in which each wheel is generally tangential to a corresponding arc associated with a corresponding radius extending from a reference point.

6. The mower according to claim 1 wherein the movement mode comprises a trim mode in which a critical point of the mowing deck faces a boundary to be trimmed, the critical point associated with the outermost cutting edge of the at least one cutting blade.

7. The mower according to claim 1 wherein each generally semi-circular section contains a generally vertical shaft coupled to a cutting blade, a periphery of the mowing deck having the indentations as open regions between adjacent semi-circular sections.

8. The mower according to claim 1 wherein the wheels are free from mechanical interference to rotate with respect to a steered axis over a range of at least ninety degrees.

9. The mower according to claim 1 wherein the wheels are oriented generally tangentially to a circular region about a geometric center point of the mower to provide a zero turn radius for the movement of the mower.

10. The mower according to claim 1 wherein the wheels are rotatable with respect to a steered axis over at least three-hundred and sixty degrees.

11. The mower according to claim 1 such that the at least one cutting blade provides a swath that is greater than or equal to a wheel spacing of the wheels.

12. The mower according to claim 1 such that the at least one cutting blade provides a swath that is greater than or equal to a spacing between outer sides of the wheels in at least a rotating mode and a linear mode.

13. The mower according to claim 1 wherein the propulsion unit comprises an engine selected from the group consisting of an internal combustion engine, a diesel engine, a gasoline engine, an alternating current electrical motor, direct current electrical motor, an induction motor, and an electrical motor.

* * * * *